(12) United States Patent
Ichihara et al.

(10) Patent No.: US 10,353,247 B2
(45) Date of Patent: Jul. 16, 2019

(54) OPTICAL MEMBER, OPTICAL MEMBER PRODUCING METHOD, AND IMAGE DISPLAY DEVICE

(71) Applicant: FUJIFILM Corporation, Tokyo (JP)

(72) Inventors: Nobuhiko Ichihara, Kanagawa (JP); Yoji Ito, Kanagawa (JP); Michio Nagai, Kanagawa (JP); Daisuke Kashiwagi, Kanagawa (JP); Akira Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/044,578

(22) Filed: Feb. 16, 2016

(65) Prior Publication Data

US 2016/0245968 A1    Aug. 25, 2016

(30) Foreign Application Priority Data

Feb. 20, 2015    (JP) .................................. 2015-032298

(51) Int. Cl.
| | | |
|---|---|---|
| *G02F 1/1337* | (2006.01) | |
| *G06F 3/03* | (2006.01) | |
| *G02B 5/26* | (2006.01) | |
| *G06F 3/0354* | (2013.01) | |
| *G06K 9/22* | (2006.01) | |
| *G02B 5/20* | (2006.01) | |
| *G02F 1/1333* | (2006.01) | |

(52) U.S. Cl.
CPC .......... *G02F 1/133711* (2013.01); *G02B 5/26* (2013.01); *G06F 3/0321* (2013.01); *G06F 3/03545* (2013.01); *G06K 9/222* (2013.01); *G02B 5/208* (2013.01); *G02F 1/13338* (2013.01)

(58) Field of Classification Search
CPC ... G02F 1/133711; G02F 2001/133738; G02B 5/208

See application file for complete search history.

(56) References Cited

U.S. PATENT DOCUMENTS

2004/0238816 A1    12/2004  Tano et al.
2008/0182041 A1*   7/2008  Sekine ................ G02B 5/3016
                                                              428/29

(Continued)

FOREIGN PATENT DOCUMENTS

JP    2001-141906 A    5/2001
JP    2004-030989 A    1/2004

(Continued)

OTHER PUBLICATIONS

Notification of Reasons for Refusal issued by the Japanese Patent Office (JPO) on Dec. 12, 2017, in connection with corresponding Japanese Patent Application No. 2015-032298.

(Continued)

*Primary Examiner* — Michael H Caley
*Assistant Examiner* — Jonathan Y Jung
(74) *Attorney, Agent, or Firm* — Edwards Neils, LLC; John C. Edwards, Esq.

(57) ABSTRACT

An optical member having a base and an underlayer with a region A of surface energy AE and a region B of surface energy BE (BE-AE>0 mN/m), in which a dot of a wavelength-selective reflective cholesteric structure is disposed on the region B, has high pattern position accuracy for the patterns formed with the dots.

24 Claims, 4 Drawing Sheets

(56) References Cited

U.S. PATENT DOCUMENTS

| | | | |
|---|---|---|---|
| 2008/0233360 A1* | 9/2008 | Sekine | B32B 38/145 428/195.1 |
| 2008/0252064 A1 | 10/2008 | Sekine et al. | |
| 2009/0310047 A1* | 12/2009 | Shin | G09G 3/3659 349/37 |
| 2010/0078642 A1* | 4/2010 | Tano | H01L 51/0004 257/59 |
| 2011/0266549 A1* | 11/2011 | Onodera | H01L 51/0022 257/71 |
| 2014/0313268 A1* | 10/2014 | Nakano | B41J 11/0015 347/102 |

FOREIGN PATENT DOCUMENTS

| | | |
|---|---|---|
| JP | 2005-310962 A | 11/2005 |
| JP | 2008-225727 A | 9/2008 |
| JP | 2008-238669 A | 10/2008 |

OTHER PUBLICATIONS

Notification of Reasons for Refusal issued by the Japanese Patent Office (JPO) dated Mar. 12, 2019, in connection with Japanese Patent Application No. 2015-032298.

\* cited by examiner

Fig. 5
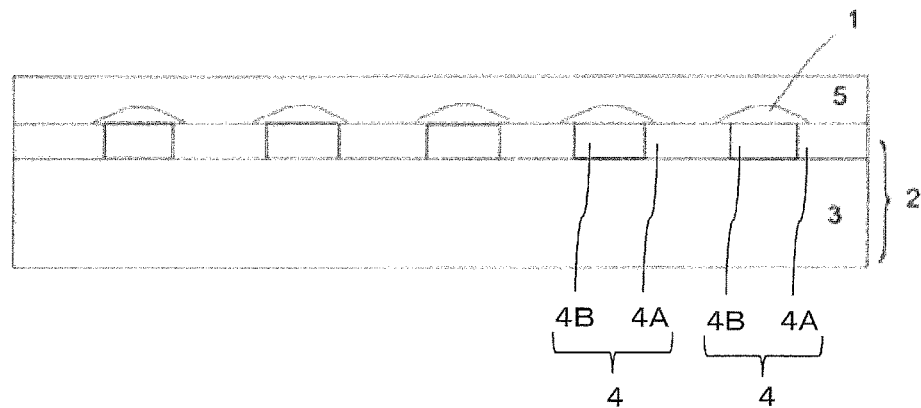
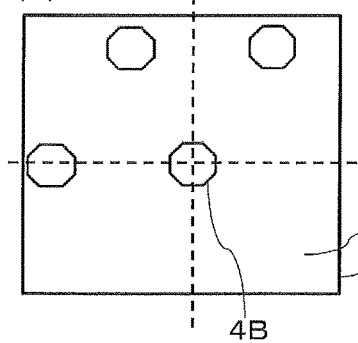
Fig. 6(A)
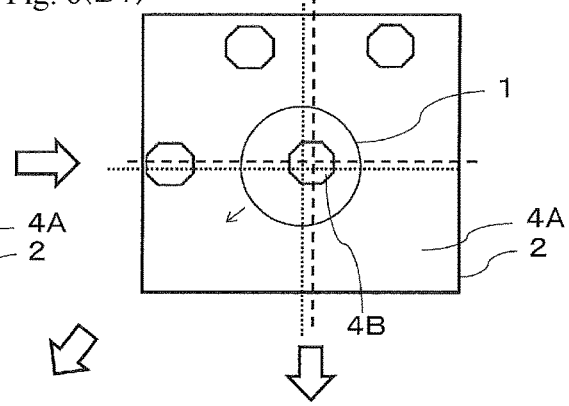
Fig. 6(B1)
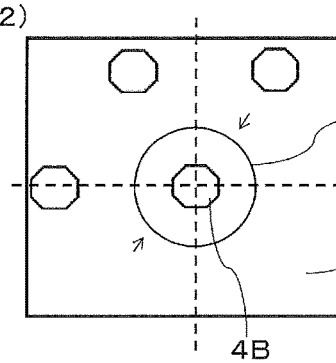
Fig. 6(C2)
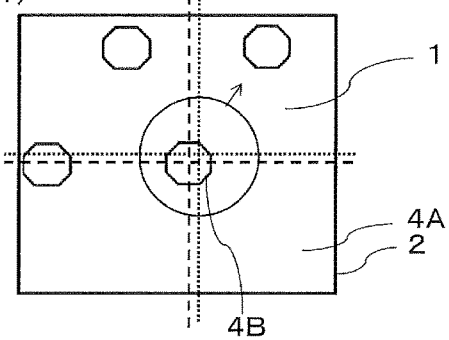
Fig. 6(C1)

OPTICAL MEMBER, OPTICAL MEMBER PRODUCING METHOD, AND IMAGE DISPLAY DEVICE

CROSS-REFERENCE TO RELATED APPLICATIONS

The present application claims the benefit of priority from Japanese Patent Application No. 2015-032298, filed on Feb. 20, 2015, the contents of which are herein incorporated by reference in their entirety.

BACKGROUND OF THE INVENTION

1. Field of the Invention

The present invention relates to an optical member, an optical member producing method, and an image display device. Specifically, the invention relates to an optical member that has high position accuracy for patterns formed with dots having a cholesteric structure, and to a method for producing such an optical member, and to an image display device having the optical member.

2. Description of the Related Art

Materials having a cholesteric structure have wavelength selective reflectivity, and have been used as constituent materials of various optical members by taking advantage of this characteristic. For example, JP-A-2008-238669 describes a pattern printed sheet with a non-visible light reflecting transparent pattern printed on a surface of a water-repellent layer of a substrate comprised of a base and the water-repellent layer. The ink forming the transparent pattern contains a non-visible light reflecting material. The non-visible light reflecting material is a liquid crystal material having a fixed cholesteric structure with wavelength selective reflectivity for the wavelengths of the non-visible light region. The water-repellent layer contains a leveling agent, and has a surface free energy of 40 to 45 mJ/m$^2$. When installed in a display device having an image display capability and used in combination with an input terminal (or an electronic pen as it is commonly called) that is capable of applying and detecting non-visible light such as infrared rays, the pattern printed sheet of this publication is described as being usable as a member that provides a coordinate detecting means that can be suitably used in a data input system of a type that makes input of handwriting data directly through a display device screen.

The present inventors studied the pattern printed sheet provided with the low-surface energy underlayer described in the foregoing publication, and found that, with the configuration of the pattern printed sheet of this publication, the fixed dots with a cholesteric structure will be off-center from the target coordinate positions even when printed in patterns to make the dot center lie on the target coordinate positions. This led to the finding that the configuration of the pattern printed sheet of the related art above involves poor pattern position accuracy in forming a pattern of dots having a cholesteric structure.

SUMMARY OF THE INVENTION

It is accordingly an object of the present invention to provide an optical member that has high pattern position accuracy for patterns formed with dots having a cholesteric structure.

The present inventors conducted intensive studies to solve the foregoing problem, and found that the problem can be solved when a substrate is used that includes a base and an underlayer separated into region A and region B having surface energies satisfying a specific relationship, and when dots are disposed on the high-surface-energy region B of the underlayer not described in the foregoing related art, using the low-surface-energy region A of the underlayer in combination. The present invention was completed on the basis of this finding.

An advantage of some aspects of the present invention and preferred forms of the invention intended to solve the foregoing problem are as follows.

[1] An optical member comprising a substrate wherein:
the substrate comprises a base and an underlayer provided on the base,
the underlayer has a surface with a region A of surface energy AE and a region B of surface energy BE,
a dot of a wavelength-selective reflective cholesteric structure is disposed on the region B, and
the surface energy AE and the surface energy BE satisfies the relation:

$$BE-AE>0 \text{ mN/m}.$$

[2] It is preferable in the optical member according to [1] that the surface energy AE and the surface energy BE satisfy 5 mN/m<BE-AE<18 mN/m.

[3] It is preferable in the optical member according to [1] or [2] that the dot has a surface energy CE, and the surface energy AE and the surface energy CE satisfy −6 mN/m<CE-AE<12 mN/m.

[4] It is preferable in the optical member according to any one of [1] to [3] that the region A and the region B of the underlayer are fabricated by being printed.

[5] It is preferable in the optical member according to any one of [1] to [3] that the region A and the region B of the underlayer represent a layer with a surface energy that varies under applied energy.

[6] It is preferable in the optical member according to any one of [1] to [5] that the region A includes a surfactant containing a fluorine atom.

[7] It is preferable in the optical member according to any one of [1] to [6] that the region B has a structure that includes a shape having a form of a hemisphere, a ball cap, or any such shape with a curvature that is convex up relative to the surface.

[8] It is preferable in the optical member according to any one of [1] to [7] that the region B includes a material with a liquid crystal aligning capability.

[9] It is preferable in the optical member according to [8] that the material with a liquid crystal aligning capability contains a compound comprised of a liquid crystal material.

[10] It is preferable in the optical member according to [9] that the liquid crystal material is horizontally aligned.

[11] It is preferable in the optical member according to [8] that the material with a liquid crystal aligning capability is a material for optical alignment films.

[12] It is preferable in the optical member according to [8] that the material with a liquid crystal aligning capability contains a compound having a hydroxyl group.

[13] It is preferable in the optical member according to [8] or [12] that the material with a liquid crystal aligning capability contains a polyvinyl alcohol compound, or a poly(meth)acryl compound having a polar group.

[14] It is preferable in the optical member according to any one of [1] to [13] that the cholesteric structure provides a stripe pattern of bright zone and dark zone in a cross sectional view of the dot under a scanning electron microscope, and that the dot includes a portion in which a dot height continuously increases to maximum height from a dot end toward the dot center, and that the dot in said portion makes an angle of 70° to 90° between the dot surface opposite the substrate and a normal line of a line represented by the first dark zone from the dot surface opposite the substrate.

[15] It is preferable in the optical member according to [14] that the quotient of the maximum height divided by a diameter of the dot is 0.13 to 0.30.

[16] It is preferable in the optical member according to [14] or [15] that the dot at the dot end makes an angle of 27° to 62° between the substrate and the dot surface opposite the substrate.

[17] It is preferable in the optical member according to any one of [1] to [16] that the cholesteric structure contains a liquid crystal material having a cholesteric liquid crystal structure, and the liquid crystal material contains a surfactant.

[18] It is preferable in the optical member according to any one of [1] to [17] that the dot is formed on a surface of the substrate as a pattern of a plurality of dots.

[19] It is preferable in the optical member according to any one of [1] to [18] that the dot has a diameter of 20 to 200 nm.

[20] It is preferable in the optical member according to any one of [1] to [19] that the dot shows wavelength selective reflectivity with a maximum reflection wavelength in the infrared region.

[21] It is preferable in the optical member according to any one of [1] to [20] that the optical member is transparent in the visible light region.

[22] A method for producing an optical member comprising:
providing an underlayer region A and an underlayer region B on a base to form a substrate having an underlayer with a surface separated into the region A and the region B; and
disposing a wavelength-selective reflective dot having a cholesteric structure on the region B,
wherein the optical member satisfies BE-AE>0 mN/m in which AE is the surface energy of the region A, and BE is the surface energy of the region B.

[23] An optical member produced by the method of [22].

[24] An image display device comprising the optical member of any one of [1] to [21] and [23].

The present invention can provide an optical member that has high pattern position accuracy for patterns formed with dots having a cholesteric structure.

BRIEF DESCRIPTION OF THE DRAWINGS

FIG. 5 is a schematic diagram showing a cross sectional view of another embodiment of the optical member of the present invention.

FIGS. 6A, 6B1, 6C1, and 6C2 are diagrams schematically representing the mechanism by which the optical member of the embodiment of the present invention achieves high pattern position accuracy.

DESCRIPTION OF THE PREFERRED EMBODIMENTS

Figure 1:
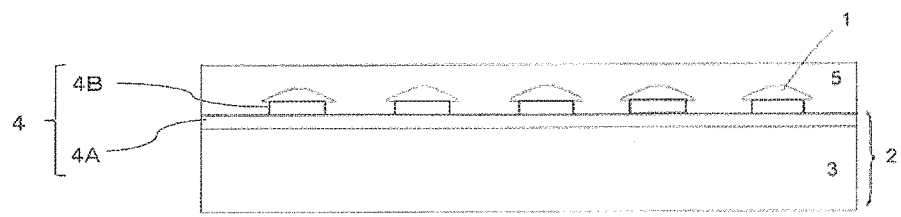
FIG. 1 is a schematic diagram showing a cross sectional view of an embodiment of the optical member of the present invention.

The present invention is described below in detail.

As used herein, numerical ranges with the preposition "to" are intended to be inclusive of the numbers defining the lower and upper limits of the ranges.

As used herein, the angles referred to as, for example, "450", "parallel", "perpendicular", or "orthogonal" are intended to be less than ±5 degrees of the angle specified, unless otherwise stated. The difference from the specified angle is preferably less than 4 degrees, more preferably less than 3 degrees.

As used herein, "(meth)acrylate" is intended to mean "acrylate" or "methacrylate", or both.

As used herein, the term "same" is intended to include the commonly accepted error ranges in the art. As used herein, the terms used to describe wholeness, for example, such as "total", "all", and "whole surface" are intended to mean 100%, but may include the commonly accepted error ranges in the art, for example, 99% or more, 95% or more, or 90% or more.

Visible light is a portion of electromagnetic waves that is visible to the human eye, and represents light in a wavelength region of 380 nm to 780 nm. Non-visible light is light in a wavelength region below 380 nm or above 780 nm.

Near-infrared light in infrared light is light in a wavelength region of 780 nm to 2500 nm. Ultraviolet light is light of 10 to 380 nm wavelengths.

The maximum reflection wavelength (also called "peak reflection wavelength") of a cholesteric structure, and its half width can be determined as follows.

A measured transmission spectrum of a cholesteric structure from a spectrophotometer UV3150 (Shimadzu Corporation) shows a reduced transmission peak in the selective reflection band. When the shorter and the longer of the two wavelengths at which the transmittance is half the highest peak height of the transmission spectrum are λ1 (nm) and λ2 (nm), respectively, the reflection center wavelength and the half width are represented by the following formulae.

Reflection center wavelength=(λ1+λ2)/2

Half width=(λ2−λ1)

The reflection center wavelength determined as the maximum reflection wavelength using this method is used instead when the maximum reflection wavelength of the cholesteric structure cannot be read from data.

As used herein, "retroreflection" means the reflection of incident light into the direction of incidence.

As used herein, "haze" means a measured value from a haze mater NDH-2000 (Nippon Denshoku Industries Co., Ltd.).

In theory, haze means a value represented by the following formula.

Haze=(diffuse transmittance of 380 to 780 nm natural light)/(diffuse transmittance of 380 to 780 nm natural light+ linear transmittance of natural light)×100%

The diffuse transmittance is a value that can be calculated by subtracting a linear transmittance from the transmittance of all directions using a spectrophotometer and an integrating sphere unit. The linear transmittance is a transmittance at 0° when it is based on a measured value using an integrating sphere unit.

Optical Member

The optical member of an embodiment of the present invention is an optical member that includes a substrate with a base and an underlayer provided on the base, the underlayer having a surface with a region A of surface energy AE, and a region B of surface energy BE, the optical member including dots having a wavelength-selective reflective cholesteric structure disposed on the region B, and satisfying the surface energy relation BE-AE>0 mN/m.

With such a configuration, the optical member of the embodiment of the present invention has high pattern position accuracy for patterns formed with dots having a cholesteric structure.

Figure 7A:
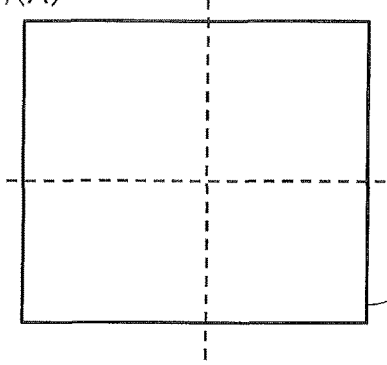
FIGS. 7A to 7C are diagrams schematically representing the mechanism by which an optical member of related art suffers from poor pattern position accuracy.
Figure 7B:
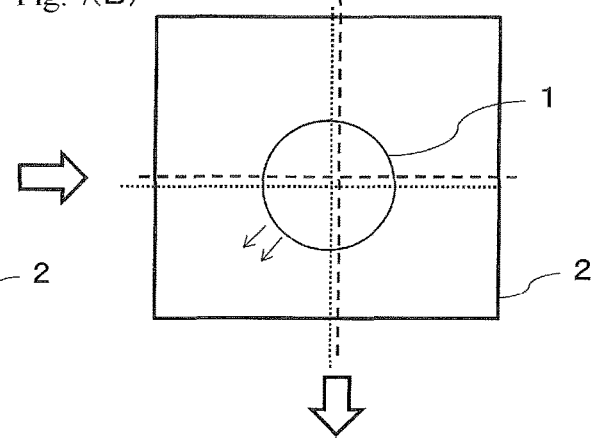
Figure 7C:
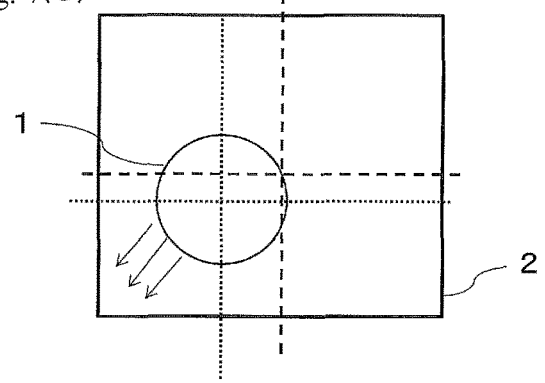

A pattern printed sheet installed in a display device having an image display capability and used in combination with an input terminal (or an electronic pen as it is commonly called) that is capable of applying and detecting non-visible light such as infrared rays can preferably be used in a data input system of a type that makes input of handwriting data directly through a display device screen. In such a pattern printed sheet, the coordinate positions on the sheet are determined from the shape of the pattern attributed to the positions of individual dots. It is therefore important for accurate data input to improve the position accuracy of the pattern so that there will be no error in recognizing the coordinate positions of an input terminal. It is, however, difficult in such a pattern printed sheet to pattern dots having a cholesteric structure by simply applying the dots. The related art, including JP-A-2008-238669, addresses this problem by using a printing method, such as gravure printing and inkjet printing, that allows setting a print target position for each dot. However, a misalignment still occurs between the target position and the pattern position even when dots are patterned using a printing method that allows setting a print target position for each dot. Without being bound by any theory, for example, an attempt to print a dot 1 of a cholesteric structure on a of FIG. 7A at a target position set at the intersection of broken lines shown in FIGS. 7A to 7C is likely to fail as the dot 1 of a cholesteric structure repels from the surface of the substrate 2 having different hydrophilicity or hydrophobicity from the dot 1, as illustrated in FIG. 7B. In an unfixed state (before being fixed by methods such as drying, baking, and curing), the dot 1 printed on or near the target position can freely move on the surface of the substrate 2 having different hydrophilicity or hydrophobicity, as illustrated in FIG. 7C. Because the dot 1 is unregulated and freely movable, the center of the dot 1 (the location where the dotted lines finer than the broken lines intersect) will deviate from the target position by a large margin.

Figure 2:
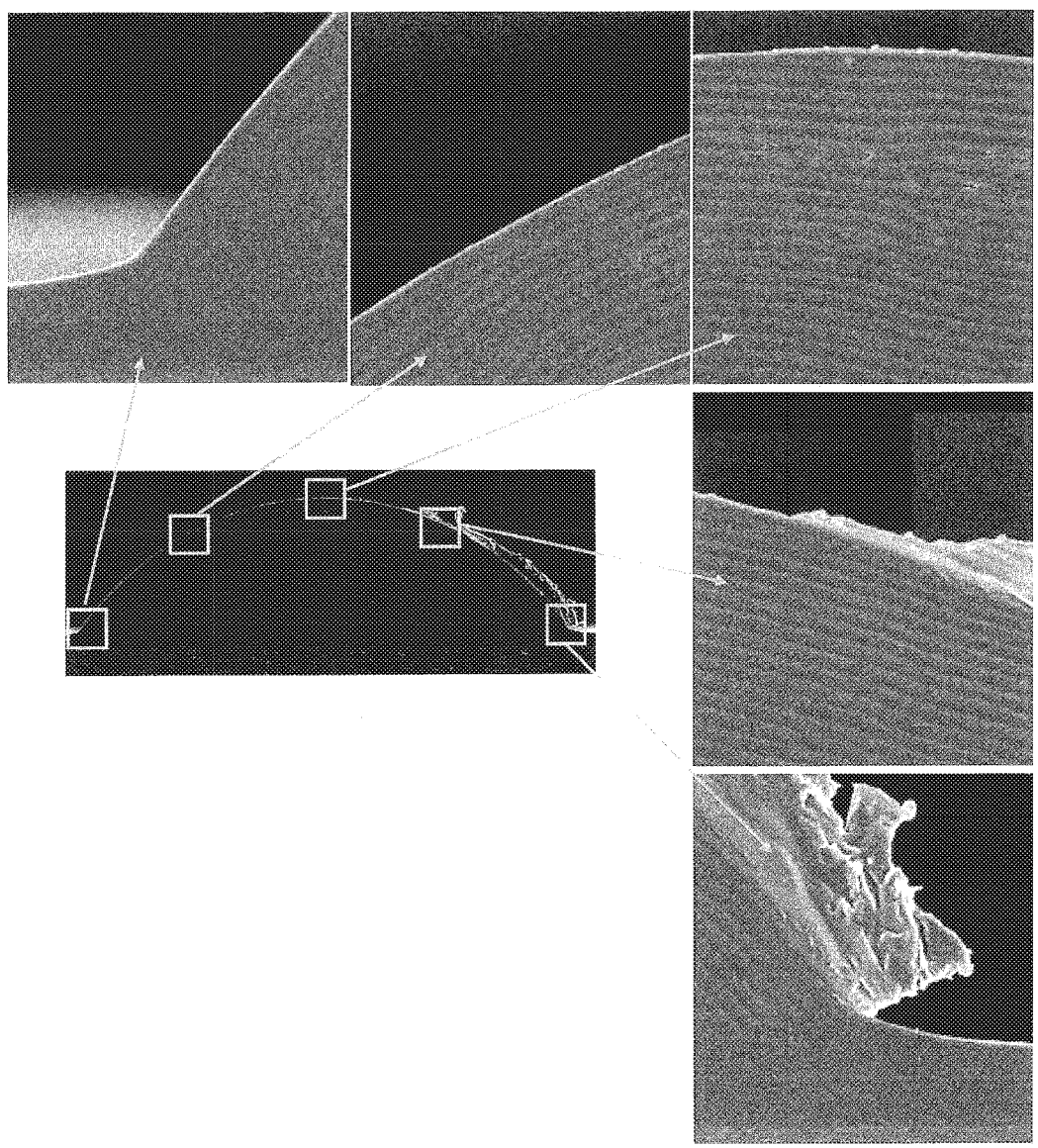
FIG. 2 shows scanning electron microscope (SEM) of a cross section of a dot of an optical member fabricated in Example.

On the other hand, the optical member of the embodiment of the present invention, without being bound by any theory, has, for example, a substrate 2 (FIGS. 6A to 6C2) with an underlayer having a preformed pattern of region A (4A in FIGS. 6A to 6C2) and region B (4B in FIGS. 6A to 6C2) satisfying BE-AE>0 mN/m. In this way, the dot 1 of a cholesteric structure printed at the target position set at the intersection of broken lines shown in FIGS. 6A, 6B1, 6C1, and 6C2 is less likely to repel in region B (4B) of the substrate 2 than in region A (4A) of the substrate 2 while being printed, as illustrated in FIG. 6B 1. This makes it easier to print the dot 1 on the target position. In an unfixed state, the dot 1 printed near the target position is more likely to repel in region A (4A) of a material having greatly different hydrophilicity or hydrophobicity, as illustrated in FIG. 6C1. On the other hand, the dot 1 is less likely to repel in region B (4B) having similar hydrophilicity or hydrophobicity, and moves on the surface of the substrate 2 in an unfixed state by being regulated. The dot 1 is thus unlikely to become off-center from the target position. In fact, the dot 1 can actually move to region B, and center itself on the target position in the manner shown in FIG. 6C2, correcting the centering. Once printed at the target position, the unfixed dot 1 is unlikely to move out of the target position because the dot 1 in an unfixed state (before being fixed by methods such as drying, baking, and curing) repels from region A (4A) of a material having greatly different hydrophilicity or hydrophobicity, as illustrated in FIG. 6C2, and is unlikely to repel in region B (4B) of similar hydrophilicity or hydrophobicity.

In a preferred form of the present invention, the dot of a cholesteric structure repels from the surface of region A, and collects into the pattern of region B in an unfixed state, even when formed by being applied. Unlike the related art, this enables patterning of dots having a cholesteric structure by way of application.

The material of region B of the underlayer can be selected from a broader range of compositions than that for the dots required to have a cholesteric structure. The composition used to form region B of the underlayer can thus be easily adjusted to achieve the desired viscosity, concentration, or surface energy that enables a pattern to be formed with the desired position accuracy using methods such as printing. In fact, the region B of the underlayer can be patterned with higher position accuracy than when patterning dots having a cholesteric structure.

Configuration

The optical member of the embodiment of the present invention has a substrate that includes a base and an underlayer. The underlayer has a surface that is separated into a region A and a region B. Dots are disposed on region B.

The shape of the optical member is not particularly limited, and may have a form of, for example, a film, a sheet, or a plate. FIG. 1 schematically represents a cross sectional view of the optical member of the embodiment of the present invention. In this example, the optical member has a substrate 2 that includes a base 3 and an underlayer 4. The underlayer 4 has a surface that is separated into a region A (4A in the figure) and a region B (4B in the figure), and dots 1 are formed on region B (4B in the figure). The optical member illustrated in FIG. 1 also has an overcoat layer 5 covering the dots 1 on the dot-forming side of the substrate. The dots 1 are formed on region B (4B in the figure) in the optical member of FIG. 1. However, the dots 1 may be formed on both region A and region B. Region B is formed on region A in the optical member of FIG. 1. However, region B is not necessarily required to be laminated on region A, and may be formed by being partially embedded in region A (not illustrated), as in the optical member illustrated in FIG. 5. The optical member of the configuration illustrated in FIG. 5 may be produced with, for example, a layer that undergoes a surface energy change upon being irradiated with energy.

Preferably, the optical member of the embodiment of the present invention is produced by using an optical member producing method of the present invention (described later).

Characteristics

The optical member of the embodiment of the present invention may be transparent or non-transparent to visible light region, as may be suited to the intended use. The optical member, however, is preferably transparent.

As used herein, "transparent" specifically means that the optical member has an unpolarized transmittance (transmittance of all directions) of 50% or more, 70% or more, preferably 85% or more for wavelengths of 380 to 780 nm.

The optical member of the embodiment of the present invention has a haze of preferably 5% or less, more preferably 2% or less, further preferably 1% or less, particularly preferably 0.7% or less.

Base

The base contained in the optical member of the embodiment of the present invention preferably has low reflectance for light of wavelengths reflected by the dots. Preferably, the base does not contain materials that reflect light of wavelengths reflected by the dots.

The base is preferably transparent to visible light region. The base may be colored, but is preferably uncolored, or only slightly colored. The base has a refractive index of about 1.2 to 2.0, more preferably about 1.4 to 1.8. These properties are needed to prevent lowering of display image visibility, for example, in applications where the optical member is used in front of a display.

The base may have a thickness as may be selected according to the intended use, and the thickness is not particularly limited. The base may have a thickness of about 5 µm to 1000 µm, preferably 10 µm to 250 µm, more preferably 15 µm to 150 µm.

The base may be a single layer or a multilayer. Examples of the base when it is a single layer include glass, triacetyl-cellulose (TAC), polyethylene terephthalate (PET), polycarbonate, polyvinyl chloride, acryl, and polyolefins.

Underlayer

The optical member of the embodiment of the present invention has an underlayer on the base. The underlayer has a surface that is separated into regions A and B having different surface energies that satisfy the relation BE-AE>0 mN/m, where AE of the surface energy of region A, and BE is the surface energy of region B. Specifically, region B has a larger surface energy than region A.

Surface Energy

In the optical member of the embodiment of the present invention, AE and BE satisfy preferably 5 mN/m<BE-AE<18 mN/m, more preferably 7 mN/m<BE-AE≤16 mN/m.

The BE-AE value is preferably greater than the preferred lower limit range in terms of improving the pattern position accuracy. The BE-AE value is preferably smaller than the preferred upper limit range in terms of improving the adhesion between region A and region B, or reducing haze.

The AE range satisfies preferably 10 mN/m≤AE≤32 mN/m, more preferably 15 mN/m≤AE≤28 mN/m, particularly preferably 16 mN/m≤AE≤26 mN/m, though it is not particularly limited.

The BE range is not particularly limited. However, BE satisfies preferably 20 mN/m≤BE≤50 mN/m in terms of printing the region B of the underlayer with desirable position accuracy, more preferably 25 mN/m≤BE≤40 mN/m. Particularly preferably, BE satisfies 28 mN/m≤BE≤33 mN/m in terms of forming the region B by inkjet printing.

In the optical member of the embodiment of the present invention, AE and CE satisfy preferably −6 mN/m<CE-AE<12 mN/m, more preferably −2 mN/m≤CE-AE≤10 mN/m, particularly preferably 0 mN/m≤CE-AE≤9 mN/m, where CE is the surface energy of the dots, as will be described later. The CE-AE value is preferably greater than the preferred lower limit range in terms of improving the pattern position accuracy. The CE-AE value is preferably smaller than the preferred upper limit range in terms of reducing haze.

The surface of the underlayer may have regions other than the region A and the region B. The wavelength-selective reflective dots are disposed on the underlayer surface in a region that includes at least region B, preferably on a surface including region A and region B, more preferably on the surface of region A and region B. The wavelength-selective reflective dots may be disposed on the underlayer surface of region B.

Materials of Region A and Region B

The optical member of the embodiment of the present invention is preferably one in which the region A and the region B of the underlayer are fabricated by printing. It is also preferable in the optical member of the embodiment of the present invention that the region A and the region B of the underlayer undergo a surface energy change upon being irradiated with energy.

The regions A and B constituting the surface of the underlayer may be the same material or different materials, as long as the relation BE-AE>0 mN/m is satisfied.

When regions A and B are different materials, the AE and BE values may be desirably controlled by varying the type and the amount of the monomer, the polymer, or other main components of regions A and B, or the type and the amount of the surfactant contained in regions A and B. When regions A and B are different materials, it is preferable to fabricate the underlayer, particularly the regions A and B, using printing.

When the regions A and B of the underlayer are fabricated using printing, the printing method is not particularly limited, and methods such as coating, and methods such as gravure printing and inkjet printing that allow setting a print target position for each dot may be used. Preferred is a printing method that allows setting a print target position, more preferably inkjet printing. The fabrication of the regions A and B of the underlayer by printing may be performed using the method described in paragraph [0030] of JP-A-2008-238669, and the method described in paragraph [0083] and the following paragraphs of JP-A-2005-310962, the contents of which are hereby incorporated by reference.

When regions A and B are the same material, it is preferable to form regions A and B as a layer that undergoes a surface energy change upon being irradiated with energy. In this case, it is preferable to desirably regulate the AE and BE values by varying the quantity of the applied energy to regions A and B, more preferably by applying energy only to one of the region A and the region B. For the formation of the regions A and B as a layer that undergoes a surface energy change upon irradiation of energy, it is possible to use the method described in paragraph [0093] of JP-A-2005-310962, and the method described in paragraphs [0237] to [0240] of JP-A-2007-41082, the contents of which are hereby incorporated by reference.

The regions A and B also may be formed by, for example, partially permeating a compound that varies the surface energy by being contained in the underlayer material, using a method such as printing.

The material used for the regions A and B constituting the underlayer surface may include a binder resin, a polymerizable compound, and a surfactant, as will be described later. The material may also contain additives. The additives are not particularly limited, and are preferably polymerization initiators when polymerizable compounds are used.

The underlayer may have layers other than the regions A and B constituting the underlayer surface. Examples of such other layers include an alignment film. However, the regions A and B may also serve as an alignment film. The region B may have a form of a hemisphere, a ball cap, or any such shape with a curvature that is convex up relative to the surface.

Binder Resin, and Polymerizable Compound

Preferably, the regions A and B of the underlayer are each independently a resin layer. More preferably, the region A and the region B are both resin layers. Particularly preferably, the region A and the region B are both transparent resin layers.

The binder resin component of the underlayer is not particularly limited.

Examples of the binder resin preferred for use in region A of the underlayer include the materials described in paragraphs 0042 to 0043 of JP-A-2010-191146 (the contents of which are hereby incorporated by reference), preferably copolymers of benzyl(meth)acrylates and (meth)acrylic acids, for example, such as a benzylmethacrylate-methacrylic acid copolymer. Also preferred as the resin component of region A of the underlayer is a thermosetting resin or a light-curable resin obtained by curing the applied composition containing a polymerizable compound. Examples of the polymerizable compound include non-liquid crystalline compounds such as (meth)acrylate monomers, and urethane monomers. Examples of the polymerizable compound preferred for use in region A of the underlayer include the materials described in paragraphs 0044 to 0045 of JP-A-2010-191146 (the contents of which are hereby incorporated by reference), preferably, multifunctional acrylates, for example, such as dipentaerythritol hexaacrylate (DPHA).

Examples of the binder resin and the polymerizable compound preferred for use in the region B of the underlayer include the same binder resins and the polymerizable compounds preferred for use in region A of the underlayer. From the standpoint of reducing the haze of the optical member when the dots with a cholesteric structure are formed using a liquid crystal material, it is preferable that the region B of the underlayer in the optical member of the embodiment of the present invention, when formed as a film, includes a material capable of regulating the alignment of liquid crystals with an anchoring force (hereinafter, such a material will be referred to as "material with a liquid crystal aligning capability", or, simply, "alignment material"). The material with a liquid crystal aligning capability is not particularly limited, and may be, for example, an alignment material containing a compound having a hydroxyl group, or an alignment material containing a compound that does not have a hydroxyl group, such as polyimide. In terms of reducing haze, it is preferable in the optical member of the embodiment of the present invention that the alignment material contained in region B of the underlayer contains a compound having a hydroxyl group. More preferably, a compound having a hydroxyl group is contained as a main component. (As used herein, "main component" refers to a component that accounts for 50 mass % or more of the layer.) The compound having a hydroxyl group used as the alignment material is not particularly limited. However, it is preferable in the optical member of the embodiment of the present invention that the alignment material contained in region B of the underlayer contains a polyvinyl alcohol compound, or a poly(meth)acryl compound having a polar group. Preferred as a poly(meth)acryl compound having a polar group is, for example, glycerol monomethacrylate (for example, the NOF product Blemmer® GLM). The alignment material contained in region B may be an optical alignment film material for forming an optical alignment film, and is not particularly limited, as long as it is a material with an optical alignment characteristic. Examples include polymer materials, such as the polyamide compounds and the polyimide compounds described in paragraphs [0024] to [0043] of WO2005/096041; the liquid crystal alignment films formed using a liquid crystal aligning agent having an optical alignment group described in JP-A-2012-155308; and the Rolic Technologies product LPP-JP265CP. The alignment material contained in region B also may be a compound of a liquid crystal material (preferably, a unidirectionally aligned liquid crystal material, more preferably, a horizontally aligned liquid crystal material), or a composition containing such a compound. It is also possible to use, for example, a liquid crystal compound-containing liquid crystal composition used to form a cholesteric structure (described later). When containing a liquid crystal compound, the liquid crystal compound is preferably the same liquid crystal compound used for the cholesteric structure of the dots, or a liquid crystal compound having high affinity to the liquid crystal compound used for the cholesteric structure of the dots.

When forming region B using the alignment material, various alignment processes may be performed that provide an anchoring force in a specific direction. It is indeed preferable to perform an alignment process because the improved alignment of the upper-layer cholesteric layer appears to improve the reflection intensity.

Surfactant

The region A of the underlayer preferably contains a surfactant. Examples of the surfactant preferred for use in region A of the underlayer include fluorine atom-containing surfactants, silicon atom-containing surfactants (silicone-based surfactants), and acrylic acid copolymer-based surfactants. The surfactant preferred for use in region A of the underlayer may be, for example, any of the materials described in paragraph 0050 of JP-A-2010-191146, (the contents of which are hereby incorporated by reference). From the standpoint of reducing haze, it is preferable in the optical member of the embodiment of the present invention that region A of the underlayer contains a fluorine atom-containing surfactant. Examples of the preferred fluorine atom-containing surfactant include the DIC product Megafac RS-90 (fluorine- and copolymer-based surfactant), the fluorine-containing compounds (particularly, fluorine-containing compounds 1 to 7) described in paragraphs [0022] to [0035], [0046] to [0050], and [0058] of JP-A-2006-342224 (the contents of which are hereby incorporated by reference), particularly preferably the fluorine- and copolymer-based surfactants. Preferred for use as the silicon atom-containing surfactant is, for example, the Shin-Etsu Chemical product X22-164C (modified silicone oil). Other examples of the surfactants include the compounds described in paragraphs [0105] to [0125], and Examples 1 and 2 of JP-A-2005-310962.

The content of the surfactant in region A of the underlayer is preferably 1 to 100 mass %, more preferably 2 to 100 mass %, particularly preferably 10 to 100 mass %, further preferably 20 to 100 mass %, even more preferably 30 to 100 mass % with respect to the total solid content in region A of the underlayer.

The region B of the underlayer preferably contains a surfactant. The surfactant used for region B of the underlayer may be the same surfactant used for region A of the underlayer. The preferred surfactants are also as described above.

The content of the surfactant in region B of the underlayer is preferably 30 mass % or less, more preferably 0.001 to 20 mass %, particularly preferably 0.001 to 10 mass % with respect to the total solid content in region B of the underlayer.

Properties of Underlayer

The underlayer may absorb visible light. However, the underlayer preferably does not absorb visible light. Specifically, the underlayer is preferably transparent.

Preferably, the underlayer has low reflectance for light of wavelengths reflected by the dots, and preferably does not contain materials that reflect light of wavelengths reflected by the dots.

The underlayer has a refractive index of preferably about 1.2 to 2.0, more preferably about 1.4 to 1.8.

The thickness of the underlayer is not particularly limited, and is preferably 10 nm to 50 μm, more preferably 50 nm to 20 μm. The region A of the underlayer has a thickness of preferably 10 to 1000 nm, more preferably 50 to 1000 nm, particularly preferably 200 to 500 nm. The region B of the underlayer has a thickness of preferably 1 to 100 μm, more preferably 5 to 50 μm, particularly preferably 10 to 30 nm. When the region B of the underlayer has a form of a hemisphere, a ball cap, or any such shape with a curvature that is convex up relative to the surface, it is preferable that the shape of the region B is the same or similar to the dot shape.

Dot

The optical member of the embodiment of the present invention has a wavelength-selective reflective dot disposed on region B, and the dot has a cholesteric structure. The region B is a portion of the substrate, and as such the dot may be described as being formed on a substrate surface in the descriptions below.

The optical member of the embodiment of the present invention satisfies preferably −6 mN/m<CE<12 mN/m, more preferably −2 mN/m≤CE≤10 mN/m, particularly preferably 0 mN/m≤CE≤9 mN/m, where CE is the surface energy of the dot. The dot may be formed on one surface or both surfaces of the substrate. It is, however, preferable to form the dot on one side of the substrate.

One or more dots may be formed on a substrate surface. It is, however, preferable to form two or more dots on a substrate surface. When two or more dots are formed, the dots may be formed close to one another on a substrate surface, and may have a total surface area of, for example, 50% or more, 60% or more, or 70% or more of the surface area on the dot-forming surface of the substrate. In any case, the optical properties of the dot, including the wavelength selective reflectivity, may represent the optical properties of substantially the whole optical member, particularly the whole dot-forming surface. The two or more dots formed on a substrate surface may be separated from one another, and may have a total surface area of, for example, less than 50%, 30% or less, or 10% or less of the surface area on the dot-forming side of the substrate. In any case, the optical properties of the dot-forming surface of the optical member may represent optical properties that can be recognized as the contrast between the optical properties of the substrate, and the optical properties of the dot.

Preferably, the optical member of the embodiment of the present invention has a pattern of dots on a substrate surface. The dots formed in a pattern may function to present information. For example, with dots formed to provide position information in a sheet-shape optical member, the optical member may be used as a data input sheet by being installed in a display.

When a plurality of dots with a diameter of, for example, 20 to 200 μm is formed in a pattern, the substrate may contain an average of 10 to 100 dots, preferably 15 to 50 dots, further preferably 20 to 40 dots in a 2 mm×2 mm square area on its surface.

When a plurality of dots is formed on a substrate surface, the dots may all have the same diameter and the same shape, or may contain dots of different diameters or shapes. It is, however, preferable that the dots have the same diameter and the same shape. For example, with the intension of forming dots of the same diameter and the same shape, the dots are preferably formed under the same conditions.

In describing dots in this specification, the descriptions are intended to cover all dots in the optical member of the present invention, including dots that do not fit the descriptions because of the acceptable inaccuracies and errors recognized in the art.

Dot Shape

The dot is preferably circular in shape when viewed in a direction normal to the substrate. The circular shape is not necessarily required to be a precise circle, but may be a substantially circular shape. The term "center" used in conjunction with dots means the center or the center of gravity of the circle. When a plurality of dots is formed on a substrate surface, and behaves as a single dot with respect to a detector, it is preferable that the dots, on average, have a circular shape, and the dots may partly contain dots of shapes that do not qualify as a circle.

The dot has a diameter of preferably 20 to 200 μm, more preferably 20 to 150 μm, particularly preferably 50 to 120 μm.

The dot diameter can be measured as the length of a straight line connecting the ends (the edge or boundary of a dot) through the dot center as viewed in an image obtained by using a microscope such as a laser microscope, a scanning electron microscope (SEM), and a transmission electron microscope (TEM). The number of dots, and the distances between dots also can be confirmed in a micrograph taken with a microscope such as a laser microscope, a scanning electron microscope (SEM), and a transmission electron microscope (TEM).

Preferably, the dot includes a portion in which the dot height continuously increases to maximum height in a direction from the end to the center of the dot. Preferably, the dot includes a sloped portion, a curved surface portion, or other such portions where the height increases from the end to the center of the dot. As used herein, "sloped portion" or "curved surface portion" may represent the portion defined above. The sloped portion or curved surface portion represents a portion surrounded by (i) a dot surface portion from the point where the height starts to continuously increase to the point representing the maximum height on the dot surface, (ii) the shortest straight lines that connect these points to the substrate, and (iii) the substrate, as viewed in a cross section.

The "height" as used herein in conjunction with dots means the shortest distance between a point on dot surface opposite the substrate and the surface on the dot-forming side of the substrate. Here, the dot surface may be an interface with other layer. When the substrate has irregularities, the surface on the dot-forming side of the substrate is an extension of the substrate surface at the dot end. The maximum height is the maximum value of the height, and is, for example, the shortest distance between the dot apex and the surface on the dot-forming side of the substrate. The dot height can be confirmed by a focal position scan with a laser microscope, or in a cross sectional view of the dot obtained using a microscope such as a SEM or a TEM.

The sloped portion or curved surface portion may represent a portion covering the dot end only in certain directions relative to the dot center, or a portion covering the dot end in all directions. For example, the dot end corresponds to the circumference of the dot when the dot is circular. However, the sloped portion or curved surface portion may represent a portion covering the dot end in a portion of the circumference (for example, a portion between 30% or more, 50% or more, or 70% or more and 90% or less of the circumference in terms of a length), or a portion covering the dot end in the whole circumference (90% or more, 95% or more, or 99% or more of the circumference). Preferably, the dot end represents the whole circumference of the dot. Specifically, it is preferable that the height change from the center to the circumference of the dot is the same in all directions. It is also preferable that optical properties such as retroreflectivity, and the properties described in a cross sectional view are the same in all directions from the center to the circumference of the dot.

The sloped portion or curved surface portion may cover a certain distance from the dot end (the dot circumference edge or boundary) toward but not reaching the center, or may cover the distance from the dot end to the center. The sloped portion or curved surface portion may also cover a certain distance from a point a certain distance away from the edge (boundary) of the dot circumference toward but not reaching the center, or may be a portion beginning from a point a certain distance away from the dot end and ending at the dot center.

The structure including the sloped portion or curved surface portion may have, for example, a hemispherical shape with a flat base on the substrate side, a hemispherical shape with a flat base on the substrate side after having an upper portion cut and planarized substantially parallel to the substrate (round trapezoidal shape), a circular cone shape with a basal plane on the substrate side, or a circular cone shape with a basal plane on the substrate side after having an upper portion cut and planarized substantially parallel to the substrate (circular cone trapezoidal shape). Preferred are the hemispherical shape with a flat base on the substrate side, the round trapezoidal shape, and the circular cone trapezoidal shape. Here, the term "hemispherical" refers to not only a hemispherical shape with the sphere center lying on the flat surface, but either of the two spherical segments obtained after cutting a sphere into two portions (preferably, the spherical segment that does not contain the sphere center).

The point of a dot surface where the dot has the maximum height preferably lies on the apex of the hemispherical or circular cone shape, or on the surface cut and planarized substantially parallel to the substrate. It is also preferable that the dot has the maximum height at all points on the planar surface. It is also preferable that the maximum height occurs at the dot center.

The quotient of the dot maximum height divided by dot diameter (maximum height/diameter) is preferably 0.13 to 0.30. This is particularly preferable in a shape in which the dot height continuously increases from the dot end to maximum height, and in which the maximum height occurs at the dot center, such as in the hemispherical shape with a flat base on the substrate side, the round trapezoidal shape, and the circular cone trapezoidal shape. Preferably, the maximum height/diameter value is 0.16 to 0.28.

The dot surface opposite the substrate, and the substrate (the surface on the dot-forming side of the substrate) make an angle (for example, a mean value) of preferably 27° to 62°, more preferably 29° to 60°. With these angles, the dot can exhibit high retroreflectivity at light incident angles suited for applications of the optical member, as will be described later.

The angle may be confirmed by a focal position scan with a laser microscope, or in a cross sectional view of the dot obtained using a microscope such as a SEM or a TEM. In this specification, however, the angle at the point of contact between the substrate and the dot surface is a measured value obtained from an SEM image of a cross section containing the dot center and taken perpendicular to the substrate.

Optical Properties of Dot

The dot has wavelength selective reflectivity. The light for which the dot shows wavelength selective reflectivity is not particularly limited, and the dot can selectively reflect, for example, infrared light, visible light, and ultraviolet light. For example, when the optical member is attached to a display, and used to input data directly through handwriting on the display device, it is preferable that the dot shows wavelength selective reflectivity for non-visible light, more preferably infrared light, so that there will be no adverse effect on the displayed image. Specifically, it is preferable in the optical member of the embodiment of the present invention that the dot shows wavelength selective reflectivity with the maximum reflection wavelength in the infrared region. Particularly preferably, the dot shows wavelength selective reflectivity for near-infrared rays. For example, it is preferable that a reflection wavelength band with the maximum reflection wavelength in a 750 to 2000 nm range, preferably a 800 to 1500 nm range can be confirmed in a dot reflection spectrum. Preferably, the reflection wavelength band having the maximum reflection wavelength in these ranges is selected according to the wavelength of the light from a light source used in combination, or the wavelength of the light detected by an imaging device (sensor).

The dot has a cholesteric structure. In the optical member of the embodiment of the present invention, the cholesteric structure of the dot contains a liquid crystal material having a cholesteric liquid crystal structure. The liquid crystal material preferably contains a surfactant. The wavelength of light for which the dot shows wavelength selective reflectivity may be selected by adjusting the helical pitch in the cholesteric structure of the liquid crystal material forming the dot. From the standpoint of improving retroreflectivity for incident rays from various directions, it is preferable that the liquid crystal material that can form the dot of the optical member has a cholesteric structure with the regulated helical axis direction, as will be described later.

Preferably, the dot is transparent to visible light region. The dot may be colored, but is preferably uncolored, or only slightly colored. These properties are needed to prevent lowering of display image visibility, for example, in applications where the optical member is used in front of a display.

Cholesteric Structure

A cholesteric structure is known to show wavelength selective reflectivity for specific wavelengths. The maximum reflection wavelength $\lambda$ of selective reflection depends on the pitch P of the helical structure (helical pitch) in the cholesteric structure, and follows the relation $\lambda = n \times P$, where n is the average refractive index of the cholesteric liquid crystal. The maximum reflection wavelength can thus be adjusted by adjusting the pitch of the helical structure. The pitch of the cholesteric structure depends on the type or the concentration of the chiral agent used with the polymerizable liquid crystal compound in forming the dot. The desired pitch can thus be obtained by adjusting these parameters. Details of pitch preparation are described in Fujifilm Research & Development, No. 50 (2005) p. 60-63. For the measurement of helix sense or pitch, the methods described in *Introduction to Liquid Crystal Chemistry Experiment* (*Ekisho Kagaku Jikken Nyumon*), the Japanese Liquid Crystal Society, Sigma Publishers, 2007, p. 46, and the methods described in *Liquid Crystal Handbook* (*Ekisho Binran*), Ekisho Binran Editorial Committee, Maruzen, p. 196 may be used.

Preferably, the cholesteric structure shows a stripe pattern of bright zone and dark zone in a cross sectional view of the dot observed under a scanning electron microscope (SEM). Two repeating units of bright zone and dark zone (two bright zones and two dark zones) correspond to the helix pitch. The pitch can thus be measured in a SEM cross sectional view. The normal line to each line of the stripe pattern is the helical axis direction.

The cholesteric structure reflects circularly polarized light. Specifically, the light reflected by the dot in the optical member of the embodiment of the present invention is circularly polarized light. Use of the optical member of the embodiment of the present invention may be selected taking into account the circularly polarized light selective reflectivity. Whether the reflected light will be right circularly polarized light or left circularly polarized light is determined by the twist direction of the helix in the cholesteric structure. The selective reflection by the cholesteric liquid crystal is such that the liquid crystal reflects right circularly polarized light when the helix twist direction of the cholesteric liquid crystal is right-handed, and left circularly polarized light when the helix twist direction is left-handed.

The half width $\Delta\lambda$ (nm) of the selective reflection band (circularly polarized light reflection band) that shows selective reflection depends on the birefringence $\Delta n$ and the pitch P of the liquid crystal compound, and follows the relation $\Delta\lambda=\Delta n\times P$. The selective reflection band width can thus be regulated by adjusting $\Delta n$. An can be adjusted, for example, by adjusting the type or the mixture ratio of the polymerizable liquid crystal compound, or by controlling the alignment fixing temperature. The half width of the reflection wavelength band is adjusted according to the intended use of the optical member of the embodiment of the present invention, and may be, for example, 50 to 500 nm, preferably 100 to 300 nm.

Cholesteric Structure of Dot

It is preferable in the optical member of the embodiment of the present invention that the cholesteric structure of the dot shows a stripe pattern of bright zone and dark zone in a cross sectional view observed under a scanning electron microscope (SEM), and that the dot has a portion in which the dot height continuously increases to maximum height in a direction from the end to the center of the dot, and in which a 70° to 90° angle is created between the dot surface opposite the substrate and a normal line of the line formed by the first dark zone from the dot surface. The portion in which the dot height continuously increases to maximum height in a direction from the end to the center of the dot is also referred to as "sloped portion" or "curved surface portion." Here, it is preferable that the angle between the dot surface opposite the substrate and the normal direction to the line formed by the first dark zone from the dot surface is 70° to 90° at all points on the sloped portion or the curved surface portion. Specifically, it is preferable that these angles are satisfied continuously throughout the sloped portion or the curved surface portion, rather than in parts of the sloped portion or the curved surface portion, for example, as in the case where the angles are satisfied intermittently in parts of the sloped portion or the curved surface portion. When the surface is curved in a cross sectional view, the angle created with the surface is the angle with respect to a tangent line to the surface. The angle is represented by an acute angle, and means an angle in a range of 70° to 110° when the angle created by the normal line and the surface is represented by a 0° to 180° range. It is preferable that the angle created between the dot surface opposite the substrate and a normal line of the line formed by the dark zone is 70° to 90° for the first two dark zones from the dot surface, as viewed in a cross section. More preferably, the angle created between the dot surface opposite the substrate and a normal line of the line formed by the dark zone is 70° to 90° for the third and fourth dark zones from the dot surface. Further preferably, the angle created between the dot surface opposite the substrate and a normal line of the line formed by the dark zone is 70° to 90° for the fifth to twelfth dark zones from the dot surface. The angle is preferably 80° to 90°, more preferably 85° to 90°.

It is preferable in a SEM cross sectional view that the helical axis of the cholesteric structure makes a 70° to 90° angle with the dot surface of the sloped portion and the curved surface portion. With such a structure, the light incident on the dot with an angle made with respect to the normal direction to the substrate can enter the sloped portion or the curved surface portion with an angle nearly parallel to the helical axis direction of the cholesteric structure. In this case, the dot can show high retroreflectivity for light entering the dot in various directions with respect to the normal direction to the substrate. For example, the dot can show high retroreflectivity for light entering the dot at an angle of 60° to 0° (also referred to as "polar angle" in this specification) with respect to a normal line to the substrate, though the angle depends on the dot shape. Preferably, the dot shows high retroreflectivity for light entering the dot at a polar angle of 45° to 0°.

With the helical axis of the cholesteric structure making a 70° to 90° angle with respect to the dot surface of the sloped portion or curved surface portion, it is preferable that the angle created by the normal direction to the line formed by the first dark zone from the surface with respect to the normal direction to the substrate continuously decreases as the height continuously increases.

As used herein, "cross sectional view" may be a cross section taken along any direction including a portion in which the height continuously increases to maximum height from the dot end toward the dot center, typically a cross section taken at any plane containing the dot center and perpendicular to the substrate.

Method of Production of Cholesteric Structure

The cholesteric structure can be obtained by fixing the cholesteric liquid crystal phase. The structure with the fixed cholesteric liquid crystal phase may be a structure maintaining the alignment of the liquid crystal compound in a cholesteric liquid crystal phase, and typically may be a structure containing a polymerizable liquid crystal compound aligned in a cholesteric liquid crystal phase, and that, upon being polymerized and cured under applied energy such as UV and heat and forming a non-fluidic layer, has been brought to a state in which the alignment does not undergo changes due to external fields or external forces. In the structure with the fixed cholesteric liquid crystal phase, the liquid crystal compound may no longer be liquid crystalline, as long as the optical properties of the cholesteric liquid crystal phase are maintained. For example, the polymerizable liquid crystal compound may increase its molecular weight after the curing reaction, and lose its liquid crystalline property.

The material used to form the cholesteric structure may be a liquid crystal composition containing a liquid crystal compound. The liquid crystal compound is preferably a polymerizable liquid crystal compound.

The liquid crystal composition containing a polymerizable liquid crystal compound further contains a surfactant. The liquid crystal composition may further contain a chiral agent, and a polymerization initiator.

Polymerizable Liquid Crystal Compound

The polymerizable liquid crystal compound may be a rod-shaped liquid crystal compound, or a disk-shaped liquid crystal compound. Preferably, the polymerizable liquid crystal compound is a rod-shaped liquid crystal compound.

Examples of the rod-shaped polymerizable liquid crystal compound used to form the cholesteric liquid crystal layer include rod-shaped nematic liquid crystal compounds. Preferred for use as the rod-shaped nematic liquid crystal compounds are azomethine, azoxy, cyanobiphenyl, cyanophenyl ester, benzoic acid ester, cyclohexanecarboxylic acid phenyl ester, cyanophenylcyclohexane, cyano substituted phenylpyrimidine, alkoxy substituted phenylpyrimidine, phenyldioxane, tolan, and alkenylcyclohexylbenzonitrile compounds. Aside from low-molecular liquid crystal compounds, it is also possible to use high-molecular liquid crystal compounds.

The polymerizable liquid crystal compound is obtained by introducing a polymerizable group to a liquid crystal compound. Examples of the polymerizable group include an unsaturated polymerizable group, an epoxy group, and an aziridinyl group. The polymerizable group is preferably an unsaturated polymerizable group, particularly preferably an ethylenic unsaturated polymerizable group. The polymerizable group may be introduced into the molecule of the liquid crystal compound using various methods. The polymerizable liquid crystal compound contains preferably 1 to 6, more preferably 1 to 3 polymerizable groups. Examples of the polymerizable liquid crystal compound include the compounds described in, for example, Makromol. Chem., Vol. 190, p. 2255 (1989), Advanced Materials, Vol. 5, p. 107 (1993), U.S. Pat. Nos. 4,683,327, 5,622,648, 5,770,107, WO95/22586, WO95/24455, WO97/00600, WO98/23580, WO98/52905, JP-A-1-272551, JP-A-6-16616, JP-A-7-110469, JP-A-11-80081, and JP-A-2001-328973. The polymerizable liquid crystal compound may be used in a combination of two or more. The alignment temperature can be lowered by using two or more polymerizable liquid crystal compounds in combination.

Specific examples of the polymerizable liquid crystal compound include the compounds represented by the following formulae (1) to (11).

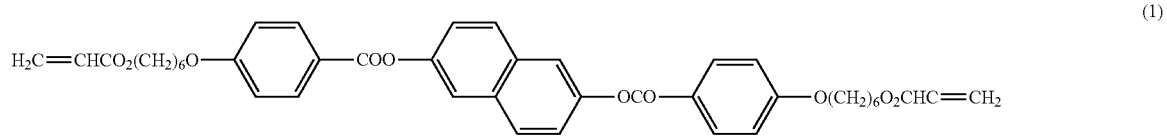

(1)

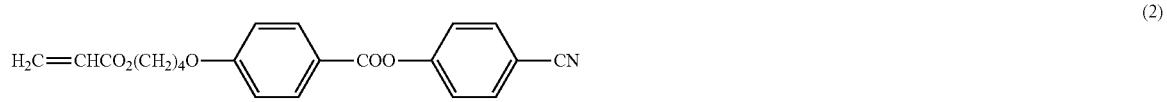

(2)

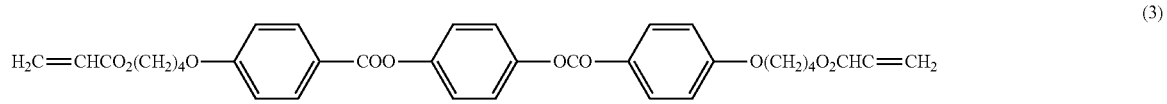

(3)

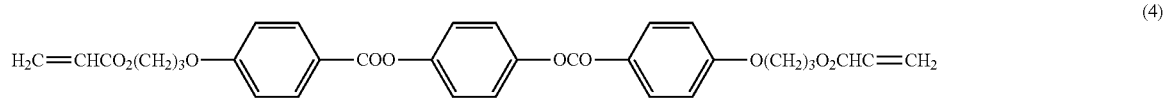

(4)

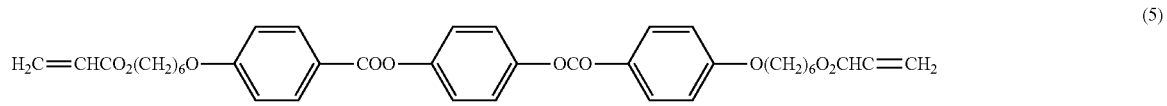

(5)

(6)

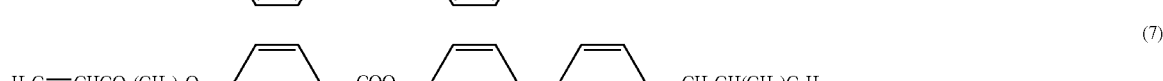

(7)

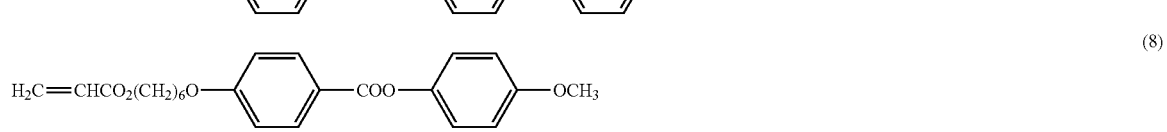

(8)

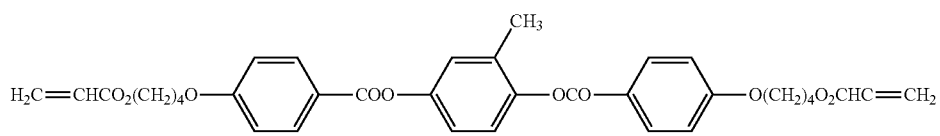

(9)

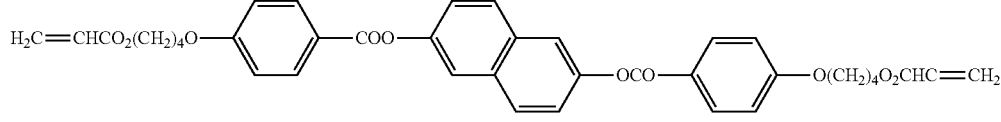

(10)

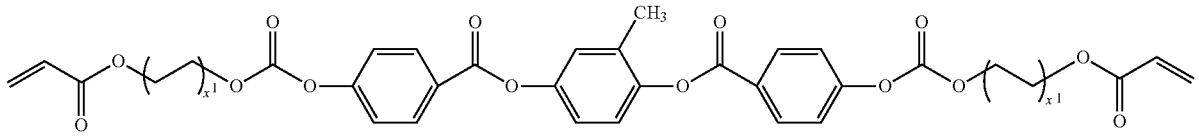

(11)

In compound (11), $X^1$ is an integer of 2 to 5.

Other than these polymerizable liquid crystal compounds, it is also possible to use, for example, cyclic organopolysiloxane compounds having a cholesteric phase, for example, such as those disclosed in JP-A-57-165480. Examples of the high-molecular liquid crystal compounds include: polymers in which a mesogen group that exhibits a liquid crystalline state has been introduced to the main chain or side chains, or to both the main chain and side chains; high-molecular cholesteric liquid crystals having a cholesteryl group introduced to side chains; liquid-crystalline polymers, such as those disclosed in JP-A-9-133810; and liquid-crystalline polymers, such as those disclosed in JP-A-11-293252.

The polymerizable liquid crystal compound is added to the liquid crystal composition in preferably 75 to 99.9 mass %, more preferably 80 to 99 mass %, particularly preferably 85 to 90 mass % with respect to the solid mass (the mass excluding the solvent) of the liquid crystal composition.

Surfactant

In terms of horizontally aligning the polymerizable liquid crystal compound at the air interface during the dot formation, and obtaining a dot that has had its helical axis direction regulated as above, it is preferable to add a surfactant to the liquid crystal composition used to form dots. Typically, dot formation requires not to lower the surface tension so that the droplet shape will be maintained during printing. It was therefore rather surprising to find that dot formation was possible with a surfactant, and that the dot obtained had high retroreflectivity in multiple directions. As will be described later in Examples, a dot with an angle of 27° to 62° between the dot surface and the substrate at the dot end was formed in the optical member of the embodiment of the present invention. Specifically, the optical member of the embodiment of the present invention can have a dot shape that shows high retroreflectivity at the light incident angles required in applications such as in an input medium used with input means such as an electronic pen. Adding a surfactant to the liquid crystal composition used to form dots is also preferable in terms of adjusting the dot surface energy CE, and regulating the CE-AE value.

The effect of the embodiment of the present invention is basically a phenomenon that occurs upon contact with the underlayer in a liquid crystal composition state. However, it was found that this effect also can be determined from the surface energy value in a state of liquid crystal dots.

The surfactant is preferably a compound that can function as an alignment regulating agent that contributes to stably or quickly making a planarly aligned cholesteric structure. The surfactant is, for example, a silicone-based surfactant or a fluorosurfactant, preferably a fluorosurfactant.

Specific examples of the surfactant that can be used for the dot include the compounds described in paragraphs [0082] to [0090] of JP-A-2014-119605, the compounds described in paragraphs [0031] to [0034] of JP-A-2012-203237, the compounds described in paragraphs [0092] and [0093] of JP-A-2005-99248, the compounds described in paragraphs [0076] to [0078], and [0082] to [0085] of JP-A-2002-129162, and the fluoro (meth)acrylate polymers described in paragraphs [0018] to [0043] of JP-A-2007-272185.

The horizontal aligning agent may be used alone or in a combination of two or more.

Particularly preferred as the fluorosurfactant are the compounds represented by the following general formula (I) described in paragraphs [0082] to [0090] of JP-A-2014-119605.

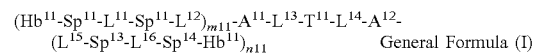

General Formula (I)

In general formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, —CONR— (R in general formula (I) represents a hydrogen atom, or an alkyl group of 1 to 6 carbon atoms). The groups —NRCO— and —CONR— have the effect to reduce solubility, and are more preferably —O—, —S—, —CO—, —COO—, —OCO—, —COS—, or —SCO— to counteract the tendency of the haze to increase during dot fabrication. In terms of compound stability, —NRCO— and —CONR— are particularly preferably —O—, —CO—, —COO—, or —OCO—. When R is an alkyl group, the alkyl group may be linear or branched. More preferably, the alkyl group is of 1 to 3 carbon atoms, for example, such as a methyl group, an ethyl group, and an n-propyl group.

$Sp^{11}$, $Sp^{12}$, $Sp^{13}$, and $Sp^{14}$ each independently represent a single bond, or an alkylene group of 1 to 10 carbon atoms, more preferably a single bond, or an alkylene group of 1 to 7 carbon atoms, further preferably a single bond, or an alkylene group of 1 to 4 carbon atoms. The hydrogen atoms of the alkylene group may be substituted with fluorine atoms. The alkylene group may be branched or unbranched. Preferably, the alkylene group is unbranched, and linear. In terms of synthesis, it is preferable that $Sp^{11}$ and $Sp^{14}$ are the same, and that $Sp^{12}$ are $Sp^{13}$ are the same.

$A^{11}$ and $A^{12}$ are monovalent to tetravalent aromatic hydrocarbon groups. The aromatic hydrocarbon group has preferably 6 to 22 carbon atoms, more preferably 6 to 14 carbon atoms, further preferably 6 to 10 carbon atoms, even more preferably 6 carbon atoms. The aromatic hydrocarbon groups represented by $A^{11}$ and $A^{12}$ may be optionally substituted. Examples of such substituents include an alkyl group of 1 to 8 carbon atoms, an alkoxy group, a halogen atom, a cyano group, and an ester group. For details and preferred ranges of these groups, reference can be made to the descriptions for T below. Examples of the substituents of the aromatic hydrocarbon groups represented by $A^{11}$ and $A^{12}$ include a methyl group, an ethyl group, a methoxy group, an ethoxy group, a bromine atom, a chlorine atom, and a cyano group. Molecules containing large numbers of perfluoroalkyl moieties within the molecule can align the liquid crystal even when added in small amounts. Because this reduces haze, it is preferable that $A^{11}$ and $A^{12}$ are tetravalent with large numbers of perfluoroalkyl groups within the molecule. In terms of synthesis, it is preferable that $A^{11}$ and $A^{12}$ are the same.

Preferably, $T^{11}$ represents a divalent group or a divalent aromatic heterocyclic group represented by the following formulae,

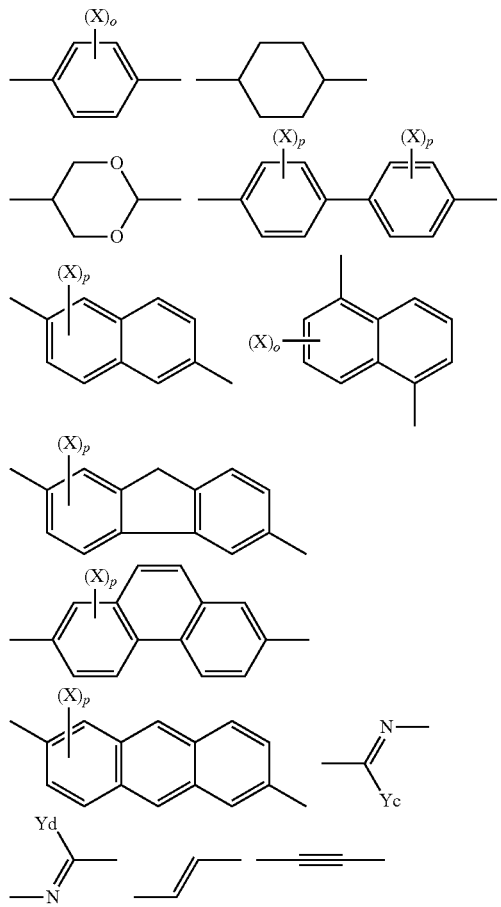

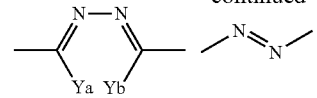

wherein X contained in $T^{11}$ represents an alkyl group of 1 to 8 carbon atoms, an alkoxy group, a halogen atom, a cyano group, or an ester group, and Ya, Yb, Yc, Yd each independently represent a hydrogen atom, or an alkyl group of 1 to 4 carbon atoms.

More preferably, $T^{11}$ is represented by the following formulae.

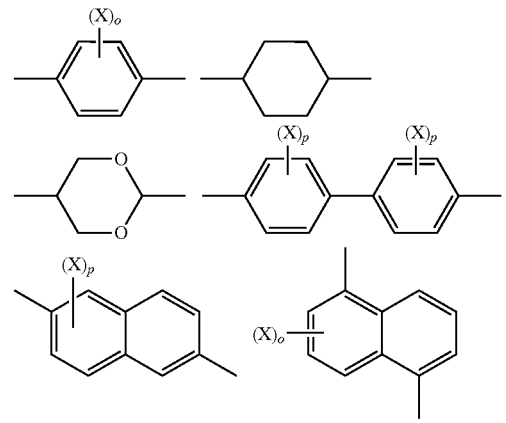

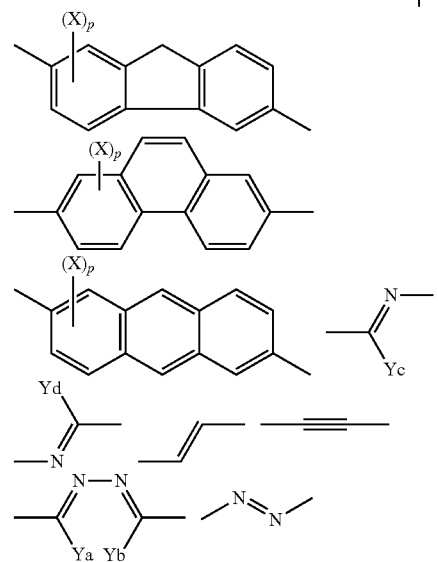

Further preferably, $T^{11}$ is represented by the following formulae.

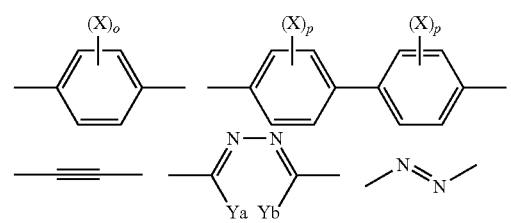

Even more preferably, $T^{11}$ is represented by the following formula.

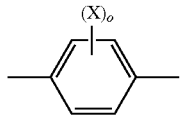

When X contained in $T^{11}$ is an alkyl group, the alkyl group has 1 to 8, preferably 1 to 5, more preferably 1 to 3 carbon atoms. The alkyl group may be linear, branched, or cyclic, and is preferably linear or branched. Preferred examples of the alkyl group include a methyl group, an ethyl group, an n-propyl group, and an isopropyl group. Preferred is a methyl group. For details of the alkyl moiety of the alkoxy group represented by X when X contained in $T^{11}$ is an alkoxy group, reference can be made to the descriptions and the preferred ranges of the alkyl group represented by X when X contained in $T^{11}$ is an alkyl group. When X contained in $T^{11}$ is a halogen atom, the halogen atom may be a fluorine atom, a chlorine atom, a bromine atom, or an iodine atom, and is preferably a chlorine atom or a bromine atom. Examples of the ester group represented by X when X contained in $T^{11}$ is an ester group include groups represented by R'COO—. R' may be, for example, an alkyl group of 1 to 8 carbon atoms. For details and preferred ranges of the alkyl group when R' is an alkyl group, reference can be made to the descriptions and the preferred ranges of the alkyl group represented by X when X contained in $T^{11}$ is an alkyl group. Specific examples of the ester include $CH_3COO$—, and $C_2H_5COO$—. The alkyl group of 1 to 4 carbon atoms represented by Ya, Yb, Yc, Yd when Ya, Yb, Yc, Yd are alkyl groups of 1 to 4 carbon atoms may be linear or branched. Examples include a methyl group, an ethyl group, an n-propyl group, and an isopropyl group.

Preferably, the divalent aromatic heterocyclic group has a five-, six-, or seven-membered heterocyclic ring, preferably a five- or six-membered heterocyclic ring, most preferably a six-membered heterocyclic ring. The heteroatoms constituting the heterocyclic ring are preferably a nitrogen atom, an oxygen atom, and a sulfur atom. The heterocyclic ring is preferably an aromatic heterocyclic ring. The aromatic heterocyclic ring is typically an unsaturated heterocyclic ring, further preferably an unsaturated heterocyclic ring having the maximum number of double bonds. Examples of the heterocyclic ring include a furan ring, a thiophene ring, a pyrrole ring, a pyrroline ring, a pyrrolidine ring, an oxazole ring, an isooxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiine ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may be optionally substituted. For details and preferred ranges of such substituents, reference can be made to the descriptions and the information concerning the possible substituents of the monovalent to tetravalent aromatic hydrocarbons represented by $A^1$ and $A^2$.

$Hb^{11}$ represents a perfluoroalkyl group of 2 to 30 carbon atoms, more preferably a perfluoroalkyl group of 3 to 20 carbon atoms, further preferably a perfluoroalkyl group of 3 to 10 carbon atoms. The perfluoroalkyl group may be linear, branched, or cyclic, and is preferably linear or branched, more preferably linear.

m11 and n11 are each independently 0 to 3, and satisfy m11+n11≥1. Here, a plurality of structures in the parenthesis may be the same or different, and is preferably the same. m11 and n11 in general formula (I) are determined by the valency of $A^{11}$ and $A^{12}$. The preferred ranges of m11 and n11 are also determined by the valency of $A^{11}$ and $A^{12}$.

o and P contained in $T^{11}$ are each independently an integer of 0 or more. When o and p are 2 or more, the plurality of X may be the same or different from each other. Preferably, o contained in $T^{11}$ is 1 or 2. p contained in $T^{11}$ is preferably an integer of 1 to 4, more preferably 1 or 2.

The compound represented by general formula (I) may have symmetry in its molecular structure, or may be asymmetrical. As used herein, "symmetry" means at least one of point symmetry, line symmetry, and rotational symmetry, and "asymmetrical" means shapes that do not qualify as any of point symmetry, line symmetry, and rotational symmetry.

The compound represented by general formula (I) is a compound combining the foregoing perfluoroalkyl group ($Hb^{11}$), the linking groups $-(-Sp^{11}-L^{11}-Sp^{12}-L^{12})_{m11}-A^{11}-L^{13}-$ and $-L^{14}-A^{12}-(L^{15}-Sp^{13}-L^{16}-Sp^{14}-)_{n11}-$, and, preferably, the divalent group T having an excluded volume effect. The two perfluoroalkyl groups ($Hb^{11}$) within the molecule are preferably the same. The linking groups $-(-Sp^{11}-L^{11}-Sp^{12}-L^{12})_{m11}-A^{11}-L^{13}-$ and $-L^{14}-A^{12}-(L^{15}-Sp^{13}-L^{16}-Sp^{14}-)_{n11}-$ present in the molecule are also preferably the same. The terminal $Hb^{11}-Sp^{11}-L^{11}-Sp^{12}-$ and $-Sp^{13}-L^{16}-Sp^{14}-Hb^{11}$ are preferably the groups represented by any of the following general formulae.

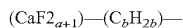

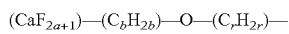

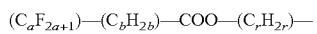

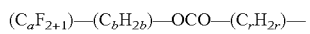

In the formulae, a is preferably 2 to 30, more preferably 3 to 20, further preferably 3 to 10. b is preferably 0 to 20, more preferably 0 to 10, further preferably 0 to 5. a+b is 3 to 30. r is preferably 1 to 10, more preferably 1 to 4.

The terminal $Hb^{11}-Sp^{11}-L^{11}-Sp^{12}-L^{12}-$ and $-L^{15}-Sp^{13}-L^{16}-Sp^{14}-Hb^{11}$ in general formula (I) are preferably the groups represented by any of the following general formulae.

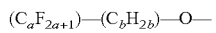

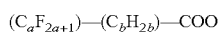

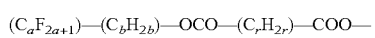

a, b, and r in these formulae are as defined above.

The amount of surfactant added in the dot or in the liquid crystal composition forming the dot is preferably 0.01 mass % to 10 mass %, more preferably 0.01 mass % to 5 mass %, particularly preferably 0.01 mass % to 0.8 mass %, even more preferably 0.02 to 0.50 mass % with respect to the total mass of the polymerizable liquid crystal compound in the dot or in the liquid crystal composition forming the dot.

Chiral Agent (Optically Active Compound)

The chiral agent functions to induce the helical structure of the cholesteric liquid crystal phase. The chiral compound should be selected according to the intended purpose because the twist direction or helical pitch of the helix it induces differs from compound to compound.

The chiral agent is not particularly limited, and may be selected from known compounds (for example, the compounds described in *Liquid Crystal Device Handbook*, Chapter 3, Section 4-3, TN, STN Chiral Agents, p. 199, the 142nd Committee of Japan Society for Promotion of Science, 1989), isosorbides, and isomannide derivatives. TN and STN are abbreviations for "twisted nematic" and "super-twisted nematic", respectively.

The chiral agent typically contains an asymmetric carbon atom. However, an axially asymmetric compound or a plane asymmetric compound containing no asymmetric carbon atom also may be used as the chiral agent. Examples of the axially asymmetric compound or plane asymmetric compound include binaphthyl, helicene, paracyclophane, and derivatives thereof. The chiral agent may have a polymerizable group. When the chiral agent and the liquid crystal compound both have polymerizable groups, a polymerization reaction between the polymerizable chiral agent and the polymerizable liquid crystal compound can produce a polymer having a repeating unit induced by the polymerizable liquid crystal compound, and a repeating unit induced by the chiral agent. In this form, the polymerizable group of the polymerizable chiral agent is preferably the same polymerizable group contained in the polymerizable liquid crystal compound. It is accordingly preferable that the polymerizable group of the chiral agent is also an unsaturated polymerizable group, an epoxy group, or an aziridinyl group, further preferably an unsaturated polymerizable group, particularly preferably an ethylenic unsaturated polymerizable group.

The chiral agent may be a liquid crystal compound.

It is preferable that the chiral agent has a photoisomerizable group because it enables forming a pattern of a desired maximum reflection wavelength corresponding to the emission wavelength upon application and alignment, and the subsequent irradiation of active rays or other forms of energy through a photomask. The photoisomerizable group is preferably an isomerization site of a photochromic compound, or an azo, an azoxy, or a cinnamoyl group. Examples of specific compounds include the compounds described in JP-A-2002-80478, JP-A-2002-80851, JP-A-2002-179668, JP-A-2002-179669, JP-A-2002-179670, JP-A-2002-179681, JP-A-2002-179682, JP-A-2002-338575, JP-A-2002-338668, JP-A-2003-313189, and JP-A-2003-313292.

Specific examples of the chiral agent include the compounds represented by the following formula (12), preferably 1 mol % to 30 mol % of the amount of the polymerizable liquid-crystalline compound.

Polymerization Initiator

When the liquid crystal composition contains a polymerizable compound, it is preferable to contains a polymerization initiator in the liquid crystal composition. In the form in which UV light is applied to promote polymerization reaction, the polymerization initiator used is preferably a photopolymerization initiator that can initiate polymerization reaction upon UV irradiation. Examples of the photopolymerization initiator include α-carbonyl compounds (U.S. Pat. Nos. 2,367,661, 2,367,670), acyloin ethers (U.S. Pat. No. 2,448,828), α-hydrocarbon substituted aromatic acyloin compounds (U.S. Pat. No. 2,722,512), polynuclear quinone compounds (U.S. Pat. Nos. 3,046,127, 2,951,758), a combination of a triarylimidazole dimer and p-aminophenylketone (U.S. Pat. No. 3,549,367), acridine and phenazine compounds (JP-A-60-105667, U.S. Pat. No. 4,239,850), and oxadiazole compounds (U.S. Pat. No. 4,212,970).

The content of the photopolymerization initiator in the liquid crystal composition is preferably 0.1 to 20 mass %, more preferably 0.5 mass % to 12 mass % with respect to the content of the polymerizable liquid crystal compound.

Crosslinker

The liquid crystal composition may optionally contain a crosslinker to improve post-curing film strength, and durability. Preferred for use as the crosslinker are those that cure under ultraviolet light, heat, moisture, or the like.

The crosslinker is not particularly limited, and may be appropriately selected according to the intended use. Examples include multifunctional acrylate compounds such as trimethylolpropane tri(meth)acrylate, and pentaerythritol tri(meth)acrylate; epoxy compounds such as glycidyl(meth) acrylate, and ethylene glycol diglycidyl ether; aziridine compounds such as 2,2-bishydroxymethylbutanol-tris[3-(1-aziridinyl)propionate], and 4,4-bis(ethyleneiminocarbonylamino)diphenylmethane; isocyanate compounds such as hexamethylene diisocyanate, and biuret-type isocyanate; polyoxazoline compounds having an oxazoline group on side chains; and alkoxysilane compounds such as vinyltrimethoxysilane, and N-(2-aminoethyl)3-aminopropyltrimethoxysilane. A known catalyst may be used according to the reactivity of the crosslinker. In this way, productivity can improve, in addition to film strength and durability. These may be used alone or in a combination of two or more.

The content of the crosslinker is preferably 3 mass % to 20 mass %, more preferably 5 mass % to 15 mass %. When the crosslinker content is less than 3 mass %, the crosslinking density improving effect may not be obtained. With a crosslinker content exceeding 20 mass %, the stability of the cholesteric liquid crystal layer may decrease.

(12)

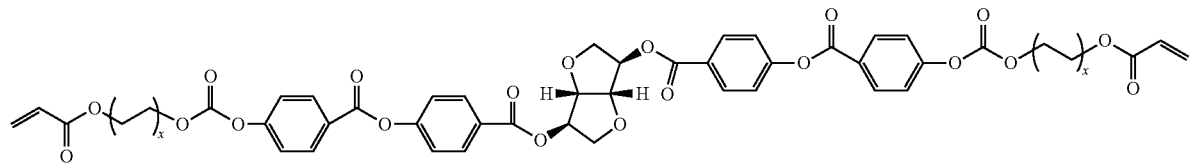

wherein X is an integer of 2 to 5.

The content of the chiral agent in the liquid crystal composition is preferably 0.01 mol % to 200 mol %, more Other Additives When using an inkjet method (described later) to form dots, a monofunctional polymerizable monomer may be used to obtain ink qualities typically desired. Examples of the monofunctional polymerizable monomer include 2-methoxyethylacrylate, isobutylacrylate, isooctylacrylate, isodecylacrylate, and octyl/decylacrylate.

Other additives such as a polymerization inhibitor, an antioxidant, a UV absorber, a photostabilizer, a color, and metal oxide microparticles also may be added, as required, to the liquid crystal composition to such an extent that there is no performance drop such as in optical performance.

Preferably, the liquid crystal composition is used in the form of a liquid when forming dots.

The liquid crystal composition may contain a solvent. The solvent is not particularly limited, and may be appropriately selected according to the intended use. The solvent is preferably an organic solvent.

The organic solvent is not particularly limited, and may be appropriately selected according to the intended use. Examples include ketones (such as methyl ethyl ketone, and methyl isobutyl ketone), alkylhalides, amides, sulfoxides, hetero ring compounds, hydrocarbons, esters, and ethers. These may be used alone or in a combination of two or more. Considering the environmental burden, ketones are particularly preferred. The foregoing components, including the monofunctional polymerizable monomer, may serve as a solvent.

The liquid crystal composition is applied to a substrate, and cured to form dots. Preferably, the liquid crystal composition is applied onto the substrate by being ejected. When applying a plurality of dots onto a substrate (typically in large numbers), the liquid crystal composition may be printed in the form of an ink. The printing method is not particularly limited, and methods such as an inkjet method, a gravure printing method, and flexography may be used. Preferred is the inkjet method. Formation of a dot pattern also may be performed by applying known printing techniques.

The liquid crystal composition applied onto the substrate is dried or heated, as required, and cured. The polymerizable liquid crystal compound in the liquid crystal composition may align while being dried or heated. When heating is performed, the heating temperature is preferably 200° C. or less, more preferably 130° C. or less.

The aligned liquid crystal compound may be further polymerized. The polymerization may be heat polymerization, or photo-polymerization by way of photo-irradiation. Preferred is photo-polymerization. Preferably, the photo-irradiation uses ultraviolet light. The irradiation energy is preferably 20 mJ/cm$^2$ to 50 J/cm$^2$, more preferably 100 mJ/cm$^2$ to 1,500 mJ/cm$^2$. The photo-irradiation may be performed under heated conditions or in a nitrogen atmosphere to promote photopolymerization reaction. The wavelength of the applied IN light is preferably 250 nm to 430 nm. Higher polymerization reaction rates are preferred from the standpoint of stability. The polymerization reaction rate is preferably 70% or more, more preferably 80% or more.

The polymerization reaction rate may be determined from the consumption rate of the polymerizable functional group using an IR (infrared) absorption spectrum.

Overcoat Layer

The optical member may include an overcoat layer. Preferably, the overcoat layer is provided on the dot-forming side of the substrate, and planarizes a surface of the optical member.

The thickness of the overcoat layer is not particularly limited. However, the overcoat layer is preferably a resin layer with a refractive index of about 1.4 to 1.8. Because the refractive index of the dot formed of the liquid crystal material is about 1.6, the angle (polar angle) of the actual incident light on the optical dot with respect to the normal line can reduced when the overcoat layer has a refractive index close to these values. For example, with an overcoat layer having a refractive index of 1.6, the light incident on the optical member at a polar angle of 45° can actually enter the dot at a polar angle of about 27°. Using the overcoat layer can thus widen the polar angle of light for which the optical member shows retroreflectivity, and a wider range of high retroreflectivity can be obtained even for dots creating a small angle between the dot surface opposite the substrate and the substrate. The overcoat layer may function as an antireflective layer, an adhesive layer, a bonding layer, or a hardcoat layer.

The overcoat layer may be, for example, a resin layer obtained by applying a monomer-containing composition to the dot-forming side of the substrate, and curing the resulting coating film. The resin is not particularly limited, and may be selected taking into account factors such as the adhesion to the substrate, or to the liquid crystal material forming the dot. For example, materials such as a thermoplastic resin, a thermosetting resin, and a UV curable resin may be used. Preferred for properties such as durability and solvent resistance are types of resins that cure through crosslinkage, particularly UV curable resins that are curable in short time periods. Examples of monomers that can be used to form the overcoat layer include ethyl(meth)acrylate, ethylhexyl(meth)acrylate, styrene, methylstyrene, N-vinylpyrrolidone, polymethylolpropanetri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat layer is not particularly limited, and may be determined taking into account the maximum height of the dot. The overcoat layer may have a thickness of about 5 μm to 100 μm, preferably 10 μm to 50 μm, more preferably 20 μm to 40 μm. Here, the thickness is the distance from the non-dot surface on the dot-forming side of the substrate to the overcoat layer surface opposite the substrate.

Use of Optical Member

The use of the optical member of the embodiment of the present invention is not particularly limited, and the optical member is applicable as various types of reflecting members.

Particularly, the optical member with patterned dots, for example, a coded dot pattern that provides position information, can be used as an input medium with input means, such as an electronic pen, used to input digitized handwriting information to an information processing device. For such an application, dots are formed using a liquid crystal material that has been prepared in such a manner that the wavelength of applied light from the input means matches the wavelength reflected by the dot. Specifically, this can be achieved by adjusting the helical pitch of the cholesteric structure using the methods described above.

The optical member of the embodiment of the present invention also may be used as an input medium such as an input sheet for display surfaces of devices such as liquid crystal displays. In such an application, the optical member is preferably transparent. The optical member may be provided as an integral unit with a display by being attached to a display surface either directly or via some other film. Alternatively, for example, the optical member may be detachably provided on a display surface. Here, it is preferable that the wavelength band of the light for which the dot of the optical member of the embodiment of the present invention shows wavelength selective reflectivity be different from the wavelength band of the light produced by the display. Specifically, it is preferable that the dot have wavelength selective reflectivity in the non-visible light region, and that the display do not produce non-visible light so that there will be no detection errors at the detector.

For details of the handwriting input system used to input digitized handwriting information to an information processing device, reference can be made to, for example, JP-A-2014-67398, JP-A-2014-98943, JP-A-2008-165385, paragraphs [0021] to [0032] of JP-A-2008-108236, or JP-A-2008-077451.

For the preferred form of the optical member of the embodiment of the present invention used as a sheet installed on a surface or in front of a surface of a display device having an image display capability, reference can be made to the form described in paragraphs [0024] to [0031] of Japanese Patent No. 4725417.

Figure 3:
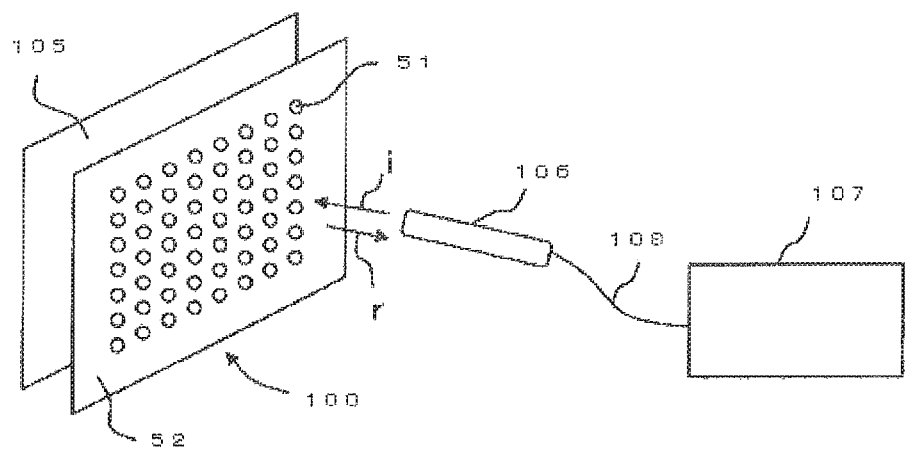
FIG. 3 is a schematic diagram of a system using the optical member of the embodiment of the present invention as a sheet installed on a surface or in front of an image display device (a display device with an image display capability).

FIG. 3 is a schematic diagram of a system using the optical member of the embodiment of the present invention as a sheet installed on a surface or in front of a surface of a display device having an image display capability.

Referring to FIG. 3, the system is not particularly limited, as long as it can produce infrared light i, and can detect reflected light r from the pattern, and may use a known sensor. As an example, the system may include a pen-shaped input terminal 106 with a read data processing unit 107, such as in the system disclosed in JP-A-2003-256137 provided with a writing tip with no ink or graphite, a CMOS (Complementary Metal Oxide Semiconductor) camera having an infrared applying section, a processor, memory, a communication interface such as a wireless transceiver using the Bluetooth® technology, and a battery.

To describe the operation of the pen-shaped input terminal 106, for example, upon tracing the front surface of an optical member 100 of the embodiment of the present invention with a writing tip in contact with the surface, the pen-shaped input terminal 106 detects the tool pressure applied to the writing tip. A CMOS camera comes into operation, and captures the pattern (for examples, about several ten to several hundred images are captured per second) as an infrared applying section applies infrared of a predetermined wavelength to a predetermined region in the vicinity of the writing tip. When the pen-shaped input terminal 106 is provided with the read data processing unit 107, the captured pattern is analyzed by the processor, and the input paths accompanying the handwriting movement of the writing tip are converted into numerical values or data to produce input path data. The input path data is then sent to an information processing device.

The components, including the processor, the memory, the communication interface (e.g., a wireless transceiver using the Bluetooth® technology), and the battery may be provided in the read data processing unit 107, outside of the pen-shaped input terminal 106, as shown in FIG. 3. In this case, the pen-shaped input terminal 106 may be connected to the read data processing unit 107 with a cord 108, or read data may be sent using a wireless means such as radio waves, and infrared light.

The input terminal 106 also may be a reader, such as that described in JP-A-2001-243006.

The read data processing unit 107 applicable to the present invention is not particularly limited, as long as it can function to calculate position information from the continuous captured data read by the input terminal 106, and combine the calculated position information with time information, and provide this information as input path data that can be handled by an information processing device. The read data processing unit 107 may include components such as a processor, memory, a communication interface, and a battery.

The read data processing unit 107 may be installed in the input terminal 106, such as in JP-A-2003-256137, or may be installed in an information processing device equipped with a display device. The read data processing unit 107 may wirelessly send position information to an information processing device equipped with a display device, or may send position information through wired connection such as via a cord.

The information processing device connected to a display device 105 uses the path information sent from the read data processing unit 107, and successively updates the image for display on the display device 105. In this way, the handwriting input path of the input terminal 106 can be displayed on the display device as though it were written on paper using a pen.

Optical Member Producing Method

An optical member producing method of the present invention is a method for producing an optical member with the steps of:

providing an underlayer region A and an underlayer region B in a base, and forming a substrate having an underlayer with a surface separated into the region A and the region B; and disposing a wavelength-selective reflective dot on the region B.

The dot has a cholesteric structure.

The optical member satisfies BE−AE>0 mN/m, where AE in the surface energy of the region A, and BE is the surface energy of the region B.

The step of forming a substrate having an underlayer with a surface separated into region A and region B is as described in detail above in conjunction with the underlayer of the optical member of the embodiment of the present invention.

The step of disposing a wavelength-selective reflective dot on region B is as described in detail above in conjunction with the dot of the optical member of the embodiment of the present invention.

Image Display Device

An image display device of an embodiment of the present invention includes the optical member of the embodiment of the present invention.

Preferably, the image display device is an image display device in which the optical member of the embodiment of the present invention is installed in front of an image display surface of the device, for example, the optical member of the embodiment of the present invention is installed in the front of the display device, or between a protective front panel and a display panel.

The preferred form of the image display device is as described above in conjunction with use of the optical member.

A system including an image display device in which the optical member of the embodiment of the present invention is installed on the image display surface or in front of the image display surface of an image display device is intended to also fall within the invention disclosed herein.

EXAMPLES

The present invention is described below in greater detail using Examples. The materials, the reagents, the amounts, the proportions, the procedures, and other variables described in the following examples may be appropriately varied, provided that such changes do not depart from the gist of the present invention. Accordingly, the scope of the present invention should not be narrowly interpreted within the limits of the concrete examples described below.

Materials

The following are details of the materials used in Examples and Comparative Examples.

Monomer

DPHA (dipentaerythritol hexaacrylate): Nippon Kayaku Co., Ltd., trade name: KAYARAD DPHA Surfactants RS-90: Megafac RS-90 (DIC; fluorine (F)-based surfactant X22-164C: Modified silicone oil (Shin-Etsu Chemical Co., Ltd.; Non-fluorine (non-F)-based surfactant)

Compound 1:

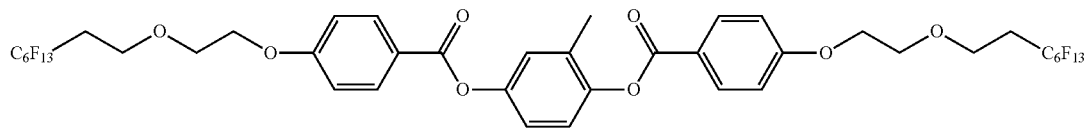

Compound 2: $R^fCONH(CH_2)_3N^+(CH_3)_3I^-$
$R^f=C_nF_{2n+1}$ (mean value of n=9)
Compound 3: $R^fCONH(CH_2)_3N^+(-O-)(CH_3)_2$
$R^f=C_nF_{2n+1}$ (mean value of n=9)
Compound 4: Compound of the structure below described in paragraph [0182] of JP-A-2005-310962

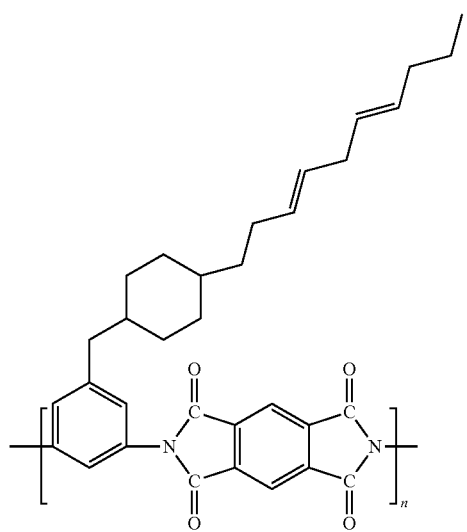

Base Agent for Region B

PVA: When the base agent of region B is PVA (polyvinyl alcohol), a PVA-containing coating liquid of the following composition was used.

Modified polyvinyl alcohol below: 50 parts by mass
Water: 371 parts by mass
Cyclohexanone: 119 parts by mass
Glutaraldehyde: 0.5 parts by mass
Photopolymerization initiator (Irgacure 2959, BASF): 0.3 parts by mass

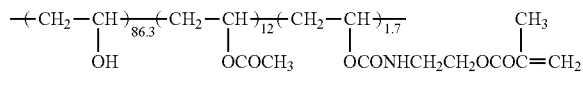

DPHA: The same monomer used for region A

Polyimide: (hydroxyl group-free compound available from Nissan Chemical Industries under the trade name SE-130)

Blemmer GLM: glycerol monomethacrylate (monomer available from NOF Corporation under the trade name Blemmer GLM)

As used herein, "base agent" of region B means a material representing the main component of region B.

Examples 1 to 3, and Comparative Example 1

Fabrication of Underlayer Region A

The following materials were stirred and dissolved in a 25° C. container to prepare a solution for forming underlayer region A.

Monomer: DPHA: 100 phr
Surfactant: Amounts presented in Table 1
IRGACURE 127 (BASF): 3.0 parts by mass
Solvent (acetone): Amounts that make the solid content 10%

The unit phr (per hundred resin) for the monomer means that the monomer was added in phr (parts by mass). For the surfactant, phr means amounts with respect to 100 phr (parts by mass) of the monomer.

The solution for forming underlayer region A prepared above was applied to a 100 μm-thick transparent PET (polyethylene terephthalate; Toyobo, Cosmoshine A4100; used without rubbing) base in a thickness of 400 nm, using a bar coater #2.6. The whole was heated until the film surface temperature reached 50° C., and dried for 1 min (prebaking). The film was then irradiated with UV light in 500 mJ/cm² under a nitrogen purge with an oxygen concentration of 100 ppm or less using a UV irradiator to promote a crosslink reaction, and fabricate region A in the underlayer. The illuminance and dose were measured at 365 nm wavelength. A mercury lamp was used.

Fabrication of Underlayer Region B

A solution for forming underlayer region B was prepared as follows. The base agent for region B, and 0.6 phr of surfactant RS-90 with respect to 100 phr of the base agent PVA for region B were stirred and dissolved in a 25° C. container containing solvent water and cyclohexanone (95:5 wt % (mass %)) to make the solid content of these components 40%.

The unit phr for the base agent means that the base agent was added in phr (parts by mass). For the surfactant, phr means amounts with respect to 100 phr (parts by mass) of the base agent.

The solution for forming underlayer region B prepared above was printed in patterns by being ejected on the whole region in a 50×50 mm area of the underlayer region A at an ejection center distance (pitch) of about 300 μm in a diameter of 20 to 150 μm (basically, 120 pmu), using an inkjet printer (DMP-2831, FUJIFILM Dimatix). The whole was heated until the film surface temperature reached 100° C., and dried for 1 min (prebaking). The underlayer region B had a height of 20 pun.

Formation of Dots with Cholesteric Structure
Preparation of Cholesteric Liquid Crystal Ink Solution The following materials were stirred and dissolved in a 25° C. container to prepare a cholesteric liquid crystal ink solution (liquid crystal composition, solid content 44%).

Methoxyethylacrylate: 100.0 parts by mass

A mixture of the rod-shaped liquid crystal compounds below: 100.0 parts by mass

Polymerization initiator of the structure below: 10.0 parts by mass

Chiral agent of the structure below: 3.8 parts by mass

Surfactant (Compound 1 above): Amounts presented in Table 1

The unit phr for the surfactant means an amount with respect to the mixture of the rod-shaped liquid crystal compounds.

Mixture of Rod-Shaped Liquid Crystal Compounds:

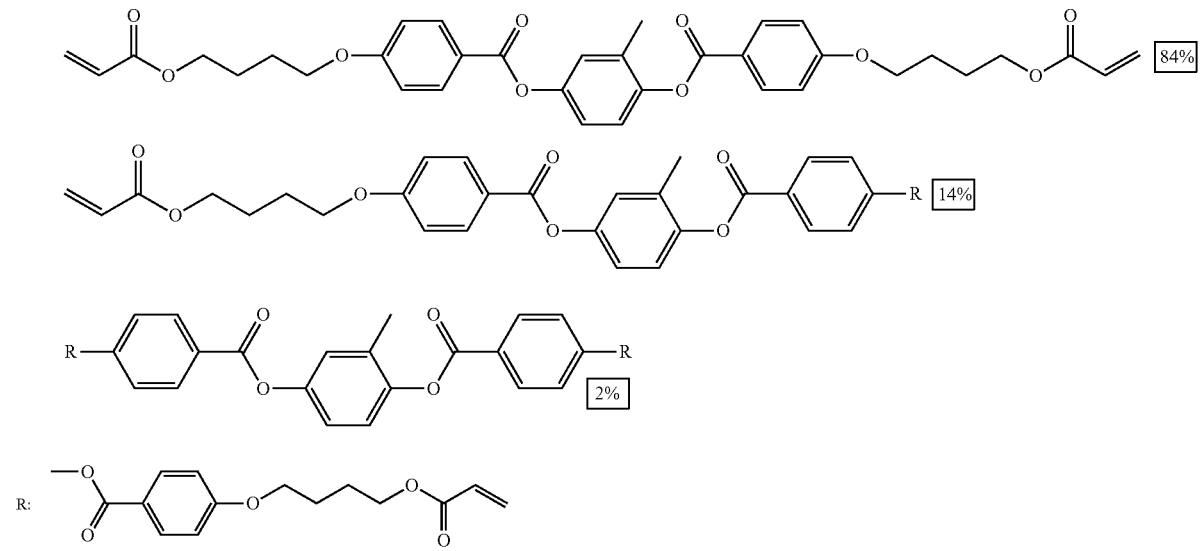

The percentages are by mass. The group represented by R represents the partial structure shown on the bottom right. The bond is formed at one of the oxygen atoms of the partial structure, as shown above.

Polymerization Initiator: IRGACURE 819 (BASF)

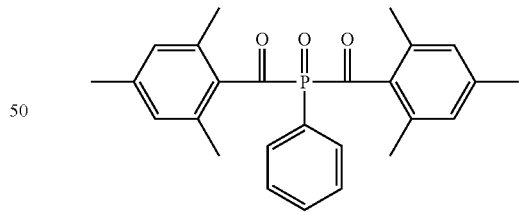

Chiral Agent:

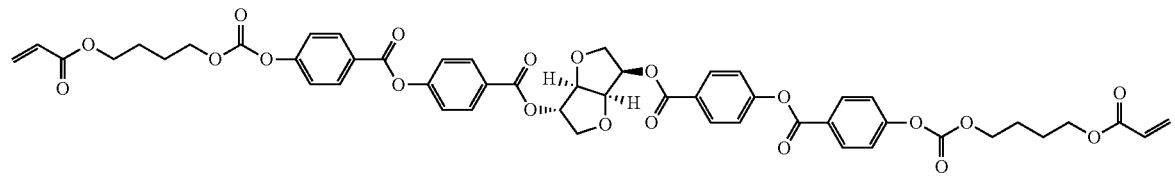 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Ejection of Cholesteric Liquid Crystal Ink Solution

The cholesteric liquid crystal ink solution prepared above was ejected on the whole region in a 50×50 mm area of the underlayer region B on the base fabricated above, using an inkjet printer (DMP-2831, FUJIFILM Dimatix). The target position for dot center was set at a dot center distance of 300 µm, and a dot diameter of 30 µm. The solution was aged at 95° C. for 30 s. This was followed by irradiation of UV light (dose, 500 mJ; illuminance, 220 mW) at 50° C. with a UV irradiator to obtain dots having a cholesteric structure. The illuminance and dose were measured at 365 nm wavelength. A mercury lamp was used.

Evaluation of Dot Shape and Cholesteric Structure

The shape of randomly selected ten dots of the optical member obtained above was observed with a laser microscope (Keyence). The dots had an average diameter of 30 µm, and an average maximum height of 4.5 µm. The angle created at the point of contact between the dot surface at the dot end (opposite the substrate) and the substrate surface (the surface of the underlayer region A or B) was 39° for region A in the case of PET (without rubbing), and the height continuously increased from the dot end toward the dot center. The quotient of the average maximum height divided by the average diameter of the dots was 0.15.

One of the dots at the center of the optical member obtained above was cut on a plane containing the dot center, perpendicular to the PET substrate, and the cross section was observed with a scanning electron microscope. The microscopy confirmed a stripe pattern of bright zone and dark zone inside the dot in a cross sectional view, as shown in FIG. 2. (FIG. 2 shows cross sectional views of the optical member of Example 1. The portion on the outer side of the semicircular shape on the right-hand side of the cross sectional views are burrs due to cutting.)

The cross sectional views were used to measure the angle created between the dot surface at the air interface and the normal direction to the first dark line from the air interface surface of the dot. The angle was 90 degrees at the dot end, 89 degrees between the dot end and the dot center, and 90 degrees at the dot center. The angle created between the normal direction to the dark line and the normal direction to the PET substrate continuously decreased from 35 degrees at the dot end to 18 degrees between the dot end and the dot center, and to 0 degree at the dot center.

The optical member of each Example was measured at randomly selected five locations in the dot disposed region over a field with a diameter of 2 mm, using a Visible-to-Near-Infrared Light Source (HL-2000), an Ultrahigh Resolution Fiber Multichannel Spectrometer (HR4000), and a two-way optical fiber (all available from Ocean Optics). The maximum reflection wavelength (peak reflection wavelength) was 850 nm in the fields of all measurement points, and retroreflectivity was confirmed for all dots in all observations conducted in a polar angle range of 0 to 50 degrees with respect to the normal line of the optical member taken as 0 degree. Specifically, the dots of the optical member were shown to have wavelength selective reflectivity with a reflection center wavelength in the infrared region.

Formation of Overcoat Layer

The following composition was stirred and dissolved in a 25° C. container to prepare a coating liquid for an overcoat.

| Coating liquid for overcoat (parts by mass) | |
|---|---|
| Acetone | 100.0 |
| KAYARAD DPCA-30 (Nippon Kayaku Co., Ltd.) | 100.0 |
| IRGACURE 819 (BASF) | 3.0 |

The coating liquid for an overcoat prepared above was applied to regions A and B of the underlayer with dots, and to the cholesteric liquid crystal dots. The liquid was applied in 40 mL/m² using a bar coater. The whole was heated until the film surface temperature reached 50° C., and dried for 60 s. This was followed by irradiation of UV light in 500 mJ/cm² using a UV irradiator to promote a crosslink reaction, and fabricate an overcoat layer.

The resulting laminate was used as an optical member in Examples 1 to 3, and Comparative Example 1.

Examples 4 to 10, and 12 to 14

The surfactant shown in Table 1 was stirred and dissolved in solvent acetone in a 25° C. container until the solid content became 10%, and a solution for forming underlayer region A was prepared.

The solution for forming underlayer region A was applied to a 100 µm-thick transparent PET (polyethylene terephthalate, Toyobo, Cosmoshine A4100; used without rubbing) base in a thickness of 400 nm using a bar coater #2.6. The whole was heated until the film surface temperature reached 50° C., and dried for 1 min (prebaking) to fabricate an underlayer region A.

A solution for forming underlayer region B was prepared, and underlayer region B was formed in the same manner as in Example 1, except that the composition was varied as shown in Table 1. In Example 13, the surfactant was not added to the solution for forming underlayer region B.

The optical members of Examples 4 to 10, and 12 to 14 were obtained by forming the dots having a cholesteric structure, and the overcoat layer in the same manner as in Example 1, except that the underlayer with regions A and B obtained above was used in place of the underlayer with regions A and B used in Example 1.

Example 11

Patterning of Region B with Variable Surface Energy Layer

The surfactant shown in Table 1 was stirred and dissolved in solvent acetone in a 25° C. container until the solid content became 10%, and a solution for forming underlayer region A was prepared.

The solution for forming underlayer region A was applied to a 100 µm-thick transparent PET (polyethylene terephthalate, Toyobo, Cosmoshine A4100; used without rubbing) base in a thickness of 400 nm using a bar coater #2.6. The whole was baked (prebaked) at 280° C. to fabricate underlayer region A.

The underlayer region A was exposed to UV light in the same pattern with the same center distance (pitch) and the same diameter used for the underlayer region B of Example 1, except that the UV (ultraviolet) dose for exposing the pattern was varied as shown in Table 1. The patterning was performed by using the technique (laser patterning irradiation) described in paragraphs [0237] to [0240] of JP-A-2007-41082. The pattern exposed portion represents the pattern of the underlayer region B, whereas the pattern unexposed portion represents the underlayer region A.

The optical member of Example 11 was obtained by forming the dots of a cholesteric structure, and the overcoat layer in the same manner as in Example 1, except that the underlayer with the underlayer regions A and B obtained above was used.

Example 15

Region B Using Non-Alignment Material as Base Agent

The underlayer region A was formed in the same manner as in Example 4.

The following materials were stirred and dissolved in a 25° C. container to prepare a solution for forming underlayer region B.

Base agent: DPHA; 100 phr
Surfactant: RS-90; 0.6 phr
Polymerization initiator: IRGACURE 127 (BASF); 3 parts by mass
Solvent: Propylene glycol monomethyl ether acetate (PG-MEA); amounts that make the solid content 40%

The unit phr for the base agent means that the base agent was added in 100 phr (parts by mass). For the surfactant, phr means amounts with respect to 100 phr (parts by mass) of the base agent.

The solution for forming underlayer region B prepared above was printed in patterns by being ejected on the whole region in a 50×50 mm area of the underlayer region A at an ejection center distance (pitch) of about 300 μm in a diameter of 20 to 150 μm (basically, 120 μm), using an inkjet printer (DMP-2831, FUJIFILM Dimatix). The whole was heated until the film surface temperature reached 100° C., and dried for 1 min (prebaking).

The film was then irradiated with UV light in 500 mJ/cm² under a nitrogen purge with an oxygen concentration of 100 ppm or less using a UV irradiator to promote a crosslink reaction, and fabricate a pattern of underlayer region B. The illuminance and dose were measured at 365 nm wavelength. A mercury lamp was used. The underlayer region B had a height of 20 μm.

The optical member of Example 15 was obtained by forming the dots of a cholesteric structure, and the overcoat layer in the same manner as in Example 1, except that the underlayer with the underlayer regions A and B obtained above was used.

Example 16

Region B Using Base Agent Containing No Hydroxyl Group

The underlayer region A was formed in the same manner as in Example 4.

The following materials were stirred and dissolved in a 25° C. container to prepare a solution for forming underlayer region B.

Base agent: polyimide; 100 phr
Surfactant: RS-90; 0.6 phr
Solvent: Water and cyclohexanone; amounts that make the solid content 40%

The unit phr for the base agent means that the base agent was added in 100 phr (parts by mass). For the surfactant, phr means amounts with respect to 100 phr (parts by mass) of the base agent.

The underlayer region B was formed in the same manner as in Example 1, except that the solution for forming underlayer region B obtained above was used in place of the solution for forming underlayer region B used in Example 1. In using polyimide as the base agent of the solution for forming underlayer region B, the pattern of the dried solution for forming underlayer region B was used as the pattern of underlayer region B, without UV irradiation.

The optical member of Example 16 was obtained by forming the dots of a cholesteric structure, and the overcoat layer in the same manner as in Example 1, except that the underlayer with the underlayer regions A and B obtained above was used.

Example 17

Region B Using Acryl Compound with Polar Group as Base Agent

The underlayer region A was formed in the same manner as in Example 4.

The following materials were stirred and dissolved in a 25° C. container to prepare a solution for forming underlayer region B.

Base agent: Blemmer GLM; 100 phr
Surfactant: RS-90; 0.6 phr
Polymerization initiator: IRGACURE 127 (BASF); 3 parts by mass
Solvent: Propylene glycol monomethyl ether acetate (PG-MEA); amounts that make the solid content 40%

The unit phr for the base agent means that the base agent was added in 100 phr (parts by mass). For the surfactant, phr means amounts with respect to 100 phr (parts by mass) of the base agent.

The film was irradiated with UV light in 500 mJ/cm² under a nitrogen purge with an oxygen concentration of 100 ppm or less using a UV irradiator to promote a crosslink reaction, and fabricate a pattern of underlayer region B. The illuminance and dose were measured at 365 nm wavelength. A mercury lamp was used. The underlayer region B had a height of 20 μm.

The optical member of Example 17 was obtained by forming the dots of a cholesteric structure, and the overcoat layer in the same manner as in Example 1, except that the underlayer with the underlayer regions A and B obtained above was used.

Example 18

Region B Using Base Agent Containing Optical Alignment Film Material

A liquid crystal aligning agent (S-3) prepared in accordance with Example 3 of JP-A-2012-155308 was used as a solution for forming underlayer region B. The solution for forming underlayer region B was printed in patterns by being ejected on the whole region in a 50×50 mm area of the underlayer region A at an ejection center distance (pitch) of about 300 μm in a diameter of 20 to 150 μm (basically, 120 μm), using an inkjet printer (DMP-2831, FUJIFILM Dimatix). The whole was heated until the film surface temperature reached 100° C., and dried for 1 min (prebaking). This was followed by polarized UV irradiation (500 mJ/cm²; a 750 W Ultrahigh-Pressure Mercury Lamp was used) under a nitrogen purge with an oxygen concentration of 100 ppm or less to promote alignment and crosslink reaction, and fabricate a pattern of underlayer region B. The illuminance and dose were measured at 365 nm wavelength. A mercury lamp was used. The underlayer region B had a height of 20 μm.

The optical member of Example 18 was obtained by forming the dots of a cholesteric structure, and the overcoat layer in the same manner as in Example 1, except that the underlayer with the underlayer regions A and B obtained above was used.

Example 19

Region B Using Base Agent Containing Liquid-Crystalline Compound

The whole surface of an underlayer region A formed in the same manner as in Example 4 was rubbed.

The following materials were stirred and dissolved in a 25° C. container to prepare a solution for forming underlayer region B.

Base agent: Rod-shaped liquid crystal composition below; 100 phr Surfactant: RS-90; 0.6 phr
Polymerization initiator: IRGACURE 127 (BASF); 3 parts by mass
Solvent: Propylene glycol monomethyl ether acetate (PG-MEA); amounts that make the solid content 40%
The unit phr is as defined in Example 1.
Mixture of Rod-Shaped Liquid Crystal Compounds

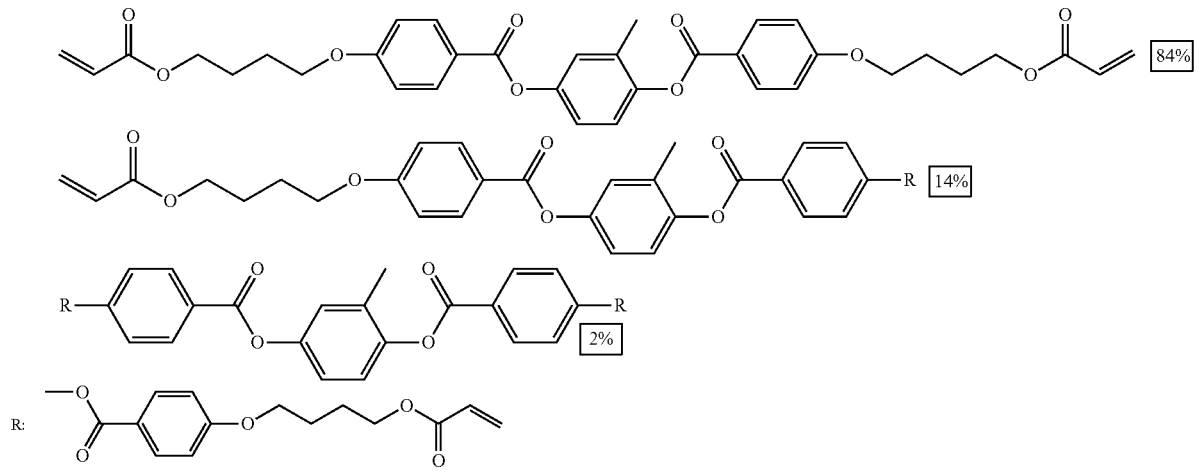

The percentages are by mass. The group represented by R represents the partial structure shown on the bottom right. The bond is formed at one of the oxygen atoms of the partial structure, as shown above.

The solution for forming underlayer region B was printed in patterns by being ejected on the whole region in a 50×50 mm area of the underlayer region A at an ejection center distance (pitch) of about 300 μm in a diameter of 20 to 150 μm (basically, 120 μm), using an inkjet printer (DMP-2831, FUJIFILM Dimatix). The film was aged at 80° C. for 30 s to align, and irradiated with UV light at 500 mJ/cm$^2$ at 30° C. to fix the aligned state, and fabricate a pattern of the underlayer region B, using a high-pressure mercury lamp that has had shorter wavelength components of UV light blocked. The illuminance and dose were measured at 365 nm wavelength. A mercury lamp was used. The underlayer region B had a height of 20 μm.

The optical member of Example 19 was obtained by forming the dots of a cholesteric structure, and the overcoat layer in the same manner as in Example 1, except that the underlayer with the underlayer regions A and B obtained above was used.

Comparative Example 2

The optical member of Comparative Example 2 was obtained in the same manner as in Comparative Example 1, except that the underlayer region B was not provided, and that the cholesteric liquid crystal ink solution was printed on underlayer region A of the base fabricated above.

Evaluations

The optical members of Examples and Comparative Examples were evaluated using the following methods.

Surface Energy Difference
Calculation of Surface Energy Using Sample Film

The materials used to make the optical members of Examples and Comparative Examples were used to fabricate a sample film having the same composition as region A of the underlayer, a sample film having the same composition as region B of the underlayer, and a sample film having the same composition as the dots having a cholesteric structure of the optical members of Examples and Comparative Examples.

The sample film thickness was 0.4 μm for the sample film having the same composition as region A of the underlayer, 20 μm for the sample film having the same composition as region B of the underlayer, and 5 μm for the sample film having the same composition as the dots having a cholesteric structure.

The surface energy of each sample film was calculated by performing a contact angle measurement. The surface energy was calculated as surface energy AE for the underlayer region A, surface energy BE for the underlayer region B, and surface energy CE for the dots having a cholesteric structure. In the contact angle measurement performed herein, the surface energy was calculated from the contact angles of water and methylene iodide, using method (c) of the methods described in paragraphs [0094] to [0098] of JP-A-2005-310962. The values of AE, BE, and CE were used to determine the BE-AE value, and the CE-AE value. The results are presented in Table 1.

Confirmation of Surface Energy of Optical Member
Calculation of Surface Energy CE of Dots Having Cholesteric Structure The overcoat layer in the optical members of Examples and Comparative Examples was soaked in 40 to 50° C. water, and peeled to expose the surface with only the dots having a cholesteric structure. The surface energy CE of the dots having a cholesteric structure was then calculated by performing a contact angle measurement for each sample.

The results matched the CE presented in Table 1.
Calculation of Surface Energy AE of Underlayer Region A The dots having a cholesteric structure were soaked in 40 to 50° C. water, and peeled to expose an underlayer surface with both region A and region B.

For the underlayer region B with the patterned dots, the layer of underlayer region B was peeled off from the underlayer surface with both region A and region B to expose the surface with only the underlayer region A. The layer of underlayer region B was detached using 70 to 80° C. water when the base agent of region B was PVA or Blemmer GLM, and ethanol when the base agent of region B was DPHA or polyimide (room temperature). For the underlayer region B using a variable surface energy layer, the procedure described below was used.

The surface energy AE of underlayer region A was calculated by performing a contact angle measurement for the surface with only the underlayer region A.

Figure 4:
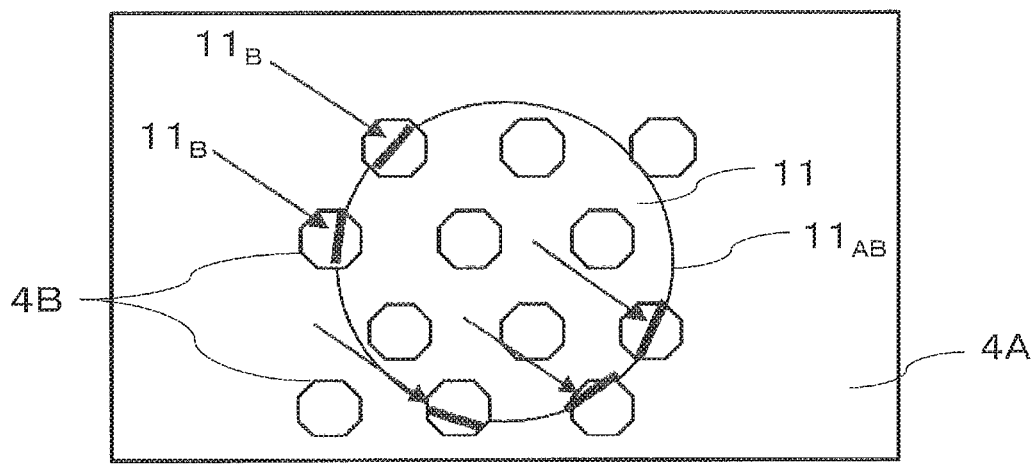
FIG. 4 is a diagram schematically representing how the surface energy BE of underlayer region B is calculated to confirm the surface energy of the optical member.

The results matched the AE presented in Table 1.
Calculation of Surface Energy BE of Underlayer Region B The surface energy BE of underlayer region B was calculated using the following method based on the Cassie-Baxter model (for a flat surface with patterns of different surface energies). For calculations, a measurement droplet 11 (contact angle measurement liquid, e.g., water, or methylene iodide) is dropped on a surface containing both underlayer region A and underlayer region B, as shown in FIG. 4. The surface energy BE of underlayer region B is then calculated from (i) the ratio of the length $R_B$ of the interface $11_B$ and the length $R_{AB}$ of the interface $11_{AB}$ representing the edge of the measurement droplet (contact angle measurement liquid), and (ii) the contact angle of underlayer region A determined above. Here, the length $R_B$ is the total length of the thicker portions on the circumference of the substantially circular interface as viewed in a direction perpendicular to the plane of the paper in FIG. 4. The interface $11_B$ represents the thicker line portions indicated by arrowhead in FIG. 4 where the contact angle measurement liquid overlaps the underlayer region B at the interface $11_{AB}$. The length $R_{AB}$ is the whole length of the circumference of the substantially circular interface as viewed in a direction perpendicular to the plane of the paper in FIG. 4.

Specifically, the surface energy BE of underlayer region B was calculated according to the following formula.

$$\cos \theta_{A+B} = \{(R_{AB}-R_B)/R_{AB}\} \times \cos \theta_A + (R_B/R_{AB}) \times \cos \theta_B,$$

wherein $\theta_{A+B}$ is the contact angle (known) of the layer containing both the underlayer region A and the underlayer region B, OA is the contact angle (known) of underlayer region A, and $\theta_B$ is the contact angle (unknown) of underlayer region B.

The foregoing equation was solved for $\theta_B$, and the surface energy BE of underlayer region B was calculated using the same technique used to calculate the surface energy from the contact angle.

The result matched the BE presented in Table 1.

When the underlayer region B is a variable surface energy layer, a part of the surface containing both the underlayer region A and the underlayer region B obtained in the manner as described for the calculation of the surface energy AE of underlayer region A was irradiated with varying doses of 0 to 10 J/cm² only in the underlayer region B, using the finding described in paragraph [0169] of JP-A-2005-310962, and the technique (laser patterning irradiation) described in paragraphs [0237] to [0240] of JP-A-2007-41082. The dose X at which the contact angles of the whole regions A and B saturate was then found from the measurement results. Thereafter, the surface containing both the underlayer region A and the underlayer region B was irradiated at (10−X) J/cm² only in the underlayer region A in portions different from the foregoing irradiation locations, and the surface energy BE was calculated from the surface energy calculated from the whole contact angle. By using the Cassie-Baxter formula above, the contact angle of region A was calculated from the known contact angle of region B, and the contact angle of the whole regions A and B. The surface energy AE of underlayer region B was then determined from the result of this calculation.

Position Accuracy

The position accuracy of the pattern (dot pattern) in the optical members of Examples and Comparative Examples was measured by measuring the distance between the dot center target position and the center of the dot actually ejected and fixed. The measurement was made for arbitrarily chosen 100 dots. The mean value of the distances for the 100 dots was obtained as the pattern position accuracy.

For actual applications, the pattern position accuracy needs to be less than 10 μm, preferably 5 μm or less, more preferably 4 μm or less, particularly preferably 3 μm or less.

The results are presented in Table 1.
A/B Adhesion Evaluation

The dots having a cholesteric structure was peeled from the optical members of Examples and Comparative Examples in the same manner as in the evaluation of surface energy difference. An adhesive tape (available from Nichiban under the trade name Cellotape®) was attached to the surface of the underlayer region B. The adhesive tape was then detached, and the surface was visually inspected.

Percentage detachment was determined according to the following formula.

Percentage detachment=(number of dots in the detached portion)/(number of dots in the region where the tape was attached)×100(%)

The percentage detachment was evaluated as the adhesion between region A and region B (A/B adhesion) according to the following criteria.

A: Percentage detachment of 0% or more and less than 5%

B: Percentage detachment of 5% or more and less than 15%

C: Percentage detachment of 15% or more and less than 30%

D: Percentage detachment of 30% or more and less than 50%

E: Percentage detachment of 50% or more

The results are presented in Table 1. A/B adhesion was not evaluated in Example 11 and Comparative Example 2.

Haze

The optical members (optical members with an overcoat layer) of Examples and Comparative Examples were measured for haze using a haze mater (Nippon Denshoku Industries Co., Ltd.). The measured haze values are presented in Table 1.

The optical members of Examples were also measured for unpolarized transmittance (transmittance of all directions) at 380 to 780 nm wavelengths at the time of the haze measurement. The measured values were 85% or higher. Specifically, it was found that the optical members of Examples were transparent in the visible light region.

TABLE 1

| | Underlayer | | | | | | | | | |
|---|---|---|---|---|---|---|---|---|---|---|
| | Region A | | | | AE | Region B | | | | BE | Patterning |
| | Monomer | | Surfactant | | | Base agent | | Surfactant | | | |
| | Type | phr | Type | phr | mN/m | Type | phr | Type | phr | mN/m | method |
| Com. Ex. 1 | DPHA | 100 | RS-90 | 0.6 | 33.0 | PVA | 100 | RS-90 | 0.6 | 33.0 | Printing |
| Ex. 1 | DPHA | 100 | RS-90 | 2 | 32.0 | PVA | 100 | RS-90 | 0.6 | 33.0 | Printing |
| Ex. 2 | DPHA | 100 | RS-90 | 10 | 28.0 | PVA | 100 | RS-90 | 0.6 | 33.0 | Printing |
| Ex. 3 | DPHA | 100 | RS-90 | 20 | 27.0 | PVA | 100 | RS-90 | 0.6 | 33.0 | Printing |
| Ex. 4 | None | 0 | RS-90 | 100 | 21.0 | PVA | 100 | RS-90 | 0.6 | 33.0 | Printing |
| Ex. 5 | None | 0 | Compound 2 | 100 | 15.2 | PVA | 100 | RS-90 | 0.6 | 33.0 | Printing |
| Ex. 6 | None | 0 | Compound 3 | 100 | 14.6 | PVA | 100 | RS-90 | 0.6 | 33.0 | Printing |
| Ex. 7 | None | 0 | RS-90 | 100 | 21.0 | PVA | 100 | RS-90 | 0.6 | 33.0 | Printing |
| Ex. 8 | None | 0 | RS-90 | 100 | 21.0 | PVA | 100 | RS-90 | 0.6 | 33.0 | Printing |
| Ex. 9 | None | 0 | RS-90 | 100 | 21.0 | PVA | 100 | RS-90 | 0.6 | 33.0 | Printing |
| Ex. 10 | None | 0 | RS-90 | 100 | 21.0 | PVA | 100 | RS-90 | 0.6 | 33.0 | Printing |
| Ex. 11 | None | 0 | Compound 4 | 100 | 21.0 | Region A pattern exposure (UV irradiation 4.5 J/cm2) | | | | 33.0 | Variable surface energy layer |
| Ex. 12 | None | 0 | RS-90 | 100 | 15.0 | PVA | 100 | RS-90 | 20 | 27.0 | Printing |
| Ex. 13 | None | 0 | RS-90 | 100 | 27.0 | PVA | 100 | None | — | 39.0 | Printing |
| Ex. 14 | None | 0 | X22-164C | 100 | 21.0 | PVA | 100 | RS-90 | 0.6 | 33.0 | Printing |
| Ex. 15 | None | 0 | RS-90 | 100 | 21.0 | DPHA | 100 | RS-90 | 0.6 | 33.0 | Printing |
| Ex. 16 | None | 0 | RS-90 | 100 | 21.0 | Polyimide | 100 | RS-90 | 0.6 | 33.0 | Printing |
| Ex. 17 | None | 0 | RS-90 | 100 | 21.0 | Blemmer GLM | 100 | RS-90 | 0.6 | 33.0 | Printing |
| Ex. 18 | None | 0 | RS-90 | 100 | 21.0 | Composition described in JP-A-2012-155308 | | | | 33.0 | Printing |
| Ex. 19 | None | 0 | RS-90 | 100 | 21.0 | Liquid crystal compound | 100 | RS-90 | 0.6 | 33.0 | Printing |
| Com. Ex. 2 | DPHA | 100 | RS-90 | 0.6 | 33.0 | — | — | — | — | — | Printing |

| | Dot | | | Surface energy difference | | Evaluations | | |
|---|---|---|---|---|---|---|---|---|
| | Surfactant | | CE | BE − AE | CE − AE | Position accuracy | | Haze |
| | Type | phr | mN/m | mN/m | mN/m | μm | A/B adhesion | % |
| Com. Ex. 1 | Compound 1 | 0.08 | 25.0 | 0.0 | −8.0 | 10 | A | 0.6 |
| Ex. 1 | Compound 1 | 0.08 | 25.0 | 1.0 | −7.0 | 5 | A | 0.6 |
| Ex. 2 | Compound 1 | 0.08 | 25.0 | 5.0 | −3.0 | 5 | A | 0.6 |
| Ex. 3 | Compound 1 | 0.08 | 25.0 | 6.0 | −2.0 | 4 | A | 0.6 |
| Ex. 4 | Compound 1 | 0.08 | 25.0 | 12.0 | 4.0 | 3 | A | 0.6 |
| Ex. 5 | Compound 1 | 0.08 | 25.0 | 17.8 | 9.8 | 3 | B | 0.8 |
| Ex. 6 | Compound 1 | 0.08 | 25.0 | 18.4 | 10.4 | 3 | C | 1.2 |
| Ex. 7 | Compound 1 | 1.00 | 14.6 | 12.0 | −6.4 | 5 | A | 0.6 |
| Ex. 8 | Compound 1 | 0.60 | 15.2 | 12.0 | −5.8 | 4 | A | 0.6 |
| Ex. 9 | Compound 1 | 0.01 | 33.0 | 12.0 | 12.0 | 3 | A | 0.8 |
| Ex. 10 | Compound 1 | 0.00 | 34.0 | 12.0 | 13.0 | 3 | A | 1.2 |
| Ex. 11 | Compound 1 | 0.08 | 25.0 | 12.0 | 4.0 | 3 | — | 0.6 |
| Ex. 12 | Compound 1 | 0.20 | 19.0 | 12.0 | 4.0 | 3 | A | 0.6 |
| Ex. 13 | Compound 1 | 0.02 | 31.0 | 12.0 | 4.0 | 3 | A | 0.6 |
| Ex. 14 | Compound 1 | 0.08 | 25.0 | 12.0 | 4.0 | 3 | A | 0.8 |
| Ex. 15 | Compound 1 | 0.08 | 25.0 | 12.0 | 4.0 | 3 | A | 1.2 |
| Ex. 16 | Compound 1 | 0.08 | 25.0 | 12.0 | 4.0 | 3 | A | 0.8 |
| Ex. 17 | Compound 1 | 0.08 | 25.0 | 12.0 | 4.0 | 3 | A | 0.6 |
| Ex. 18 | Compound 1 | 0.08 | 25.0 | 12.0 | 4.0 | 3 | A | 0.6 |
| Ex. 19 | Compound 1 | 0.08 | 25.0 | 12.0 | 4.0 | 3 | A | 0.6 |
| Com. Ex. 2 | Compound 1 | 0.08 | 25.0 | — | −8.0 | 10 | — | 0.6 |

As can be seen from Table 1, it was found that the optical members of Examples had high pattern position accuracy with the patterns formed with dots having a cholesteric structure.

On the other hand, the optical member did not satisfy BE−AE>0 mN/m in Comparative Example 1, and the pattern position accuracy was poor with BE−AE=0 mN/m. The pattern position accuracy was also poor in Comparative Example 2, in which the underlayer had only low-surface-energy region A, and did not have underlayer region B as in JP-A-2008-238669.

In the preferred forms of the optical members of Examples, the adhesion between region A and region B was found to be desirable. It was also found that the haze can be reduced in the preferred forms of the optical members of Examples.

Comparisons of Examples revealed the following findings.

By comparing Examples 1 to 10, it was found that the pattern position accuracy suffers when CE<<AE as the dots having a cholesteric structure do not repel on region A, and do not easily move on region B. It was found that, when CE>>AE, the dot having a cholesteric structure stays in region B, and increases its thickness as the contact angle of the dot having a cholesteric structure increases at the dot end. With the increased thickness, the material forming the cholesteric structure can no longer align itself as easily as when the dot is thicker, and the haze increases.

By comparing Examples 4, 12, and 13, it was found that varying BE alone does not bring about changes in pattern position accuracy.

INDUSTRIAL APPLICABILITY

An article with an infrared reflecting pattern using the optical member of the embodiment of the present invention is applicable to a sheet having formed thereon an infrared reflecting pattern and installed in front of a display in applications such as in a data input system of a type that allows input directly through handwriting on the screen of an image display device. With the high position accuracy, the infrared reflecting pattern using the optical member of the embodiment of the present invention can be used to provide a data input system that is less prone to errors, even in applications where the infrared reflecting pattern is printed on a transparent sheet that can provide information concerning a position of an input terminal on the transparent sheet upon the infrared reflecting pattern being read with an input terminal capable of applying and detecting infrared light. The optical member of the embodiment of the present invention is thus convenient to use, and shows high performance in actual applications, such as in various mobile terminals (e.g., cell phones), personal computers, display devices with an intercommunication function, and various information processing devices (e.g., Internet terminals). Because of the high pattern position accuracy, the optical member of the embodiment of the present invention is particularly suited in applications using an electronic pen or other such devices adapted to draw continuous lines.

In a preferred form of the optical member of the embodiment of the present invention, an infrared reflecting pattern can be provided that is hardly noticeable in the visible range. Other possible advantages include, for example, use as an information medium for an ID (identification) card authentification system that takes advantage of the inconspicuous infrared reflecting pattern portion to prevent crime, and increased freedom of card design.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2015-032298 filed Feb. 20, 2015, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims.

What is claimed is:

1. An optical member comprising a substrate wherein:
   the substrate comprises a base and an underlayer provided on the base,
   the underlayer has a surface with a region A of surface energy AE and a region B of surface energy BE,
   a dot of a wavelength-selective reflective cholesteric structure is disposed on the region B, and
   the surface energy AE and the surface energy BE satisfies the relation:

$BE-AE>0$ mN/m;

wherein the region B has a structure that includes a shape having a form of a hemisphere, a ball cap, or with a curvature that is convex up relative to the surface, and
   wherein the diameter of the dot is greater than the diameter of the region B.

2. The optical member according to claim 1, wherein the surface energy AE and the surface energy BE satisfy 5 mN/m<BE-AE<18 mN/m.

3. The optical member according to claim 1, wherein the dot has a surface energy CE, and the surface energy AE and the surface energy CE satisfy −6 mN/m<CE-AE<12 mN/m.

4. The optical member according to claim 1, wherein region A and the region B of the underlayer are fabricated by being printed.

5. The optical member according to claim 1, wherein the region A and the region B of the underlayer represent a layer with a surface energy that varies under applied energy.

6. The optical member according to claim 1, wherein the region A includes a surfactant containing a fluorine atom.

7. The optical member according to claim 1, wherein the region B includes a material with a liquid crystal aligning capability.

8. The optical member according to claim 7, wherein the material with a liquid crystal aligning capability contains a compound comprised of a liquid crystal material.

9. The optical member according to claim 8, wherein the liquid crystal material is horizontally aligned.

10. The optical member according to claim 7, wherein the material with a liquid crystal aligning capability is a material for optical alignment films.

11. The optical member according to claim 7, wherein the material with a liquid crystal aligning capability contains a compound having a hydroxyl group.

12. The optical member according to claim 7, wherein the material with a liquid crystal aligning capability contains a polyvinyl alcohol compound, or a poly(meth)acryl compound having a polar group.

13. The optical member according to claim 1,
   wherein the cholesteric structure provides a stripe pattern of bright zone and dark zone in a cross sectional view of the dot under a scanning electron microscope,
   wherein the dot includes a portion in which a dot height continuously increases to maximum height from a dot end toward the dot center, and
   wherein the dot in said portion makes an angle of 70° to 90° between the dot surface opposite the substrate and a normal line of a line represented by a first dark zone from the dot surface opposite the substrate.

14. The optical member according to claim 13, wherein the quotient of the maximum height divided by a diameter of the dot is 0.13 to 0.30.

15. The optical member according to claim 13, wherein the dot at the dot end makes an angle of 27° to 62° between the substrate and the dot surface opposite the substrate.

16. The optical member according to claim 1,
wherein the cholesteric structure contains a liquid crystal material having a cholesteric liquid crystal structure, and the liquid crystal material contains a surfactant.

17. The optical member according to claim 1, wherein the dot is formed on a surface of the substrate as a pattern of a plurality of dots.

18. The optical member according to claim 1, wherein the dot has a diameter of 20 to 200 μm.

19. The optical member according to claim 1, wherein the dot shows wavelength selective reflectivity with a maximum reflection wavelength in the infrared region.

20. The optical member according to claim 1, wherein the optical member is transparent in the visible light region.

21. A method for producing an optical member comprising:
providing an underlayer region A and an underlayer region B on a base to form a substrate having an underlayer with a surface separated into the region A and the region B; and
disposing a wavelength-selective reflective dot having a cholesteric structure on the region B,
wherein the optical member satisfies BE-AE>0 mN/m in which AE is the surface energy of the region A, and BE is the surface energy of the region B, and
wherein the region B has a structure that includes a shape having a form of a hemisphere, a ball cap, or with a curvature that is convex up relative to the surface, and
wherein the diameter of the dot is greater than the diameter of the region B.

22. An optical member produced by the method of claim 21.

23. An image display device comprising the optical member of claim 1.

24. The optical member according to claim 1, wherein the main components of regions A and B are different.

* * * * *